(12) United States Patent
Imamura et al.

(10) Patent No.: US 11,027,721 B2
(45) Date of Patent: Jun. 8, 2021

(54) DRIVE FORCE CONTROL SYSTEM FOR VEHICLE

(71) Applicant: TOYOTA JIDOSHA KABUSHIKI KAISHA, Toyota (JP)

(72) Inventors: Tatsuya Imamura, Okazaki (JP); Hideaki Komada, Gotemba (JP); Akiko Nishimine, Susono (JP); Yosuke Suzuki, Hadano (JP); Hidekazu Nagai, Susono (JP); Takahito Endo, Sunto-gun (JP); Hirotsugu Yoshino, Susono (JP); Kensei Hata, Sunto-gun (JP); Hiroki Yasui, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 16/185,883

(22) Filed: Nov. 9, 2018

(65) Prior Publication Data
US 2019/0143962 A1    May 16, 2019

(30) Foreign Application Priority Data
Nov. 13, 2017    (JP) .............................. JP2017-218612

(51) Int. Cl.
*B60W 20/50*    (2016.01)
*B60K 6/40*    (2007.10)
(Continued)

(52) U.S. Cl.
CPC ............. *B60W 20/50* (2013.01); *B60K 6/365* (2013.01); *B60K 6/387* (2013.01); *B60K 6/40* (2013.01); *B60K 6/445* (2013.01); *B60K 6/543* (2013.01); *B60W 20/30* (2013.01); *F16D 48/06* (2013.01); *F16H 3/725* (2013.01); *F16H 3/728* (2013.01); *F16H 61/12* (2013.01); *B60K 2006/381* (2013.01); *B60Y 2200/92* (2013.01); *B60Y 2400/421* (2013.01); *F16D 2500/10412* (2013.01); *F16D 2500/304* (2013.01);
(Continued)

(58) Field of Classification Search
CPC ........................................ B60W 20/50
USPC ............................................. 701/22
See application file for complete search history.

(56) References Cited

U.S. PATENT DOCUMENTS 2,000,465 A * 5/1935 Higley ...................... H02P 9/06
475/152
3,744,333 A * 7/1973 Hallberg .............. H01H 43/101
74/437
(Continued)

FOREIGN PATENT DOCUMENTS

JP    2017-007437 A    1/2017
KR    10-2010-0037204 A    4/2010
WO    WO-2014158076 A1 * 10/2014 ............... B60K 1/02

*Primary Examiner* — Jean Paul Cass
(74) *Attorney, Agent, or Firm* — Sughrue Mion, PLLC

(57) ABSTRACT

A control system for a vehicle that prevents an unintentional mode change when a command signal cannot be transmitted to an engagement device. In the vehicle, HV-Lo mode is established by connecting a carrier to a carrier by a first clutch while disconnecting the carrier from a ring gear by a second clutch, and HV-Lo mode is established by disconnecting the carrier from the carrier by the first clutch while connecting the carrier to the ring gear by the second clutch. A normally stay clutch is used as at least one of the first clutch and the second clutch.

9 Claims, 23 Drawing Sheets

(51) Int. Cl.
- *B60K 6/365* (2007.10)
- *B60K 6/387* (2007.10)
- *B60K 6/543* (2007.10)
- *F16H 3/72* (2006.01)
- *F16D 48/06* (2006.01)
- *B60K 6/445* (2007.10)
- *B60W 20/30* (2016.01)
- *F16H 61/12* (2010.01)
- *B60K 6/38* (2007.10)
- *F16H 37/08* (2006.01)

(52) U.S. Cl.
CPC ............ *F16H 2037/0873* (2013.01); *F16H 2061/1244* (2013.01); *F16H 2200/2094* (2013.01)

(56) References Cited

U.S. PATENT DOCUMENTS

| | | | | |
|---|---|---|---|---|
| 4,403,968 | A * | 9/1983 | Heidrich | B63H 23/12 440/3 |
| 4,671,394 | A * | 6/1987 | Braun | F16D 25/14 192/109 R |
| 5,080,209 | A * | 1/1992 | Yurko | B62D 11/183 192/3.57 |
| 7,137,495 | B2 * | 11/2006 | Berger | F16D 25/14 192/3.58 |
| 8,109,376 | B2 * | 2/2012 | Bek | F16D 25/12 192/70.22 |
| 2005/0221939 | A1 | 10/2005 | Takami et al. | |
| 2005/0279073 | A1 * | 12/2005 | Clauss | A01D 41/142 56/364 |
| 2006/0096414 | A1 * | 5/2006 | Gochenour | F16D 28/00 74/732.1 |
| 2008/0125265 | A1 * | 5/2008 | Conlon | B60K 6/365 475/5 |
| 2009/0048747 | A1 * | 2/2009 | Stridsberg | B60W 10/11 701/55 |
| 2009/0132135 | A1 * | 5/2009 | Quinn, Jr. | F16H 61/12 701/55 |
| 2010/0081533 | A1 | 4/2010 | Lee et al. | |
| 2010/0197436 | A1 | 8/2010 | Ideshio et al. | |
| 2011/0202222 | A1 * | 8/2011 | Yamamoto | B60W 20/00 701/22 |
| 2011/0303040 | A1 * | 12/2011 | Hagelskamp | F16H 61/0206 74/473.11 |
| 2014/0200779 | A1 * | 7/2014 | Aoki | B60W 50/082 701/58 |
| 2015/0038286 | A1 * | 2/2015 | Hane | B60K 6/26 477/3 |
| 2015/0080162 | A1 * | 3/2015 | Motoyama | B60K 6/387 475/5 |
| 2015/0142281 | A1 * | 5/2015 | Versteyhe | F16H 61/21 701/54 |
| 2015/0158484 | A1 * | 6/2015 | Sato | B60W 20/40 701/22 |
| 2015/0166048 | A1 * | 6/2015 | Herrmann | B60W 20/30 701/22 |
| 2015/0217764 | A1 * | 8/2015 | Hoshiba | B60W 10/06 701/22 |
| 2016/0053863 | A1 * | 2/2016 | Glover | B60K 6/44 74/664 |
| 2016/0152130 | A1 * | 6/2016 | Kim | B60K 6/383 475/5 |
| 2016/0264127 | A1 * | 9/2016 | Nilsson | B60K 6/547 |
| 2016/0297292 | A1 * | 10/2016 | Sato | B60W 20/50 |
| 2016/0368361 | A1 | 12/2016 | Endo et al. | |
| 2017/0015299 | A1 * | 1/2017 | Bjorkman | B60W 10/115 |
| 2017/0015300 | A1 * | 1/2017 | Lindstrom | B60K 6/445 |
| 2017/0015303 | A1 * | 1/2017 | Bjorkman | B60K 6/405 |
| 2017/0015304 | A1 * | 1/2017 | Bjorkman | B60K 6/40 |
| 2017/0015305 | A1 * | 1/2017 | Bjorkman | B60W 10/02 |
| 2017/0015336 | A1 * | 1/2017 | Bjorkman | B60K 6/405 |
| 2017/0021819 | A1 * | 1/2017 | Lindstrom | B60W 10/06 |
| 2017/0166202 | A1 * | 6/2017 | Kobayashi | B60W 10/08 |
| 2017/0291607 | A1 * | 10/2017 | Bergquist | B60W 30/18036 |
| 2018/0015929 | A1 * | 1/2018 | Miyaishi | B60W 10/107 |
| 2018/0119814 | A1 * | 5/2018 | David | F16H 61/702 |
| 2018/0339698 | A1 * | 11/2018 | Hock | B60K 6/448 |
| 2019/0143962 | A1 * | 5/2019 | Imamura | B60K 6/445 701/22 |
| 2020/0086847 | A1 * | 3/2020 | Ebuchi | B60W 10/26 |

\* cited by examiner

Fig. 4

| Operating Mode | | | CL1 | CL2 | B1 | MG1 | MG2 | ENG |
|---|---|---|---|---|---|---|---|---|
| HV Mode | HV-Lo Mode | | ● | – | – | G | M | ON |
| | HV-Hi Mode | | – | ● | – | G | M | ON |
| | Fixed Mode | | ● | ● | – | | | ON |
| EV Mode | Dual-Motor Mode | EV-Lo Mode | – | – | ● | M | M | OFF |
| | | EV-Hi Mode | – | ● | ● | M | M | OFF |
| | Single-Motor Mode | | – | – | – | | M | OFF |

|  | CL8 | CL9 | B3 | B4 |
|---|---|---|---|---|
| First Mode | – | – | O | – |
| Second Mode | O | – | O | – |
| Third Mode | – | O | O | – |
| Fourth Mode | – | O | – | – |
| Fifth Mode | O | O | – | – |
| Sixth Mode | – | O | – | O |

DRIVE FORCE CONTROL SYSTEM FOR VEHICLE

CROSS REFERENCE TO RELATED APPLICATIONS

The present disclosure claims the benefit of Japanese Patent Application No. 2017-218612 filed on Nov. 13, 2017 with the Japanese Patent Office.

BACKGROUND

Field of the Invention

Embodiments of the present disclosure relate to the art of a drive force control system for a vehicle, in which a plurality of operating mode can be established by manipulating engagement devices.

Discussion of the Related Art

JP-A-2017-007437 describes a drive unit for a hybrid vehicle having a power split mechanism. The power split mechanism taught by JP-A-2017-007437 comprises a first planetary gear unit and a second planetary gear unit. In the first planetary gear unit carrier is connected to an engine, and a sun gear is connected to a first motor. In the second planetary gear unit, a carrier is connected to a ring gear of the first planetary gear unit, and a ring gear is connected to drive wheels. The carrier of the first planetary gear unit and the sun gear of the second planetary gear unit are selectively connected through a first clutch, and the carrier and the ring gear of the second planetary gear unit are selectively connected through a second clutch. In the power split mechanism, a low mode in which a ratio of power delivered to an output side is relatively large is established by engaging the second clutch, and a high mode in which the ratio of power delivered to the output side is relatively small is established by engaging the first clutch, a fixed mode in which an engine torque is delivered to the drive wheels without being changed is established by engaging both of the first clutch and the second clutch, and a neutral mode in which torque transmission between the engine and the drive wheels is interrupted is established by disengaging both of the first clutch and the second clutch.

In the power split mechanism taught by JP-A-2017-007437, a hydraulically actuated normally open clutch may be used as the first and the second clutches. This kind of clutch will be disengaged when a hydraulic pressure cannot be applied thereto, even if an engagement command is transmitted thereto. For example, if the first clutch is disengaged unintentionally during propulsion in the high mode due to pressure drop, the operating mode will be shifted to the neutral mode while causing a shock.

SUMMARY

Aspects of embodiments of the present disclosure have been conceived noting the foregoing technical problems, and it is therefore an object of the present disclosure is to provide a control system for vehicles configured to prevent an unintentional mode change even when a command signal cannot be transmitted to manipulate engagement devices.

Driving force control system according to the embodiment of the present disclosure is applied to a vehicle comprising: an engine; a rotary machine; and a differential mechanism that is adapted to perform a differential rotation among a first rotary member connected to the engine, a second rotary member connected the rotary machine, and a third rotary member connected to an output member. The differential mechanism comprises a plurality of rotary elements. In order to achieve the above-explained objective, the drive force control system is provided with: a first engagement device that connects a first rotary element and a second rotary element, or a first reaction element and a stationary member; and a second engagement device that connects a third rotary element and a fourth rotary element, or a second reaction element and the stationary member. According to the embodiment, a normally stay clutch is used as at least one of the first engagement device and the second engagement device, and the normally stay clutch is adapted to be engaged upon reception of an engagement command signal and disengaged upon reception of a disengagement command signal, and to maintain a current engagement state when a signal transmission to the normally stay clutch is stopped.

In a non-limiting embodiment, the differential mechanism may be adapted to establish: a first operating mode in which a torque of the engine is delivered to the output member with a first predetermined ratio by engaging any one of the first engagement device and the second engagement device; and a second operating mode in which the torque of the engine (5) is delivered to the output member with a second predetermined ratio that is smaller than the first predetermined ratio by engaging other one of the first engagement device and the second engagement device.

In a non-limiting embodiment, the differential mechanism may be adapted to establish: a fixed mode in which a speed ratio between the engine and the output member is constant by engaging the first engagement device and the second engagement device; and a continuously variable mode in which the speed ratio between the engine and the output member is varied continuously by engaging any one of first engagement device and the second engagement device.

In a non-limiting embodiment, the third rotary element may include any one of the first rotary element and the second rotary element.

In a non-limiting embodiment, the fourth rotary element may include the rotary elements other than the first rotary element, the second rotary element, and the third rotary element.

In a non-limiting embodiment, the second reaction element may include the rotary elements other than the first reaction element.

In a non-limiting embodiment, the normally stay clutch may be used as both of the first engagement device and the second engagement device.

In a non-limiting embodiment, a normally open clutch may be used as the other one of the first engagement device and the second engagement device. Specifically, the normally open clutch may be adapted to be engaged upon reception of the engagement command signal, and disengaged when a signal transmission to the normally open clutch is stopped.

In a non-limiting embodiment, the drive force control system may further comprise a prime mover that delivered an output torque to the output member without passing through the differential mechanism.

In a non-limiting embodiment, a normally close clutch may be used as the other one of the first engagement device and the second engagement device. Specifically, the normally close clutch may be adapted to be disengaged upon reception of the disengagement command signal, and engaged when a signal transmission to the normally close clutch is stopped.

In a non-limiting embodiment, the normally stay clutch may include a dog clutch, comprising: a pair of rotary member being opposed to each other while being allowed to rotate relatively to each other; a rod that pushes and withdraw one of the rotary members toward/away from the other rotary member upon reception of the engagement command signal or the disengagement command signal; and a compression spring that transmits a load of the rod to said one of the rotary members.

In a non-limiting embodiment, the drive force control system may further comprise a controller that controls the first engagement device and the second engagement device. Specifically, the controller may be configured to: determine the engagement device in which a failure occurs out of the first engagement device and the second engagement device; determine the engagement device in which a failure occurs is engaged or disengaged; disengage the engagement device working properly if the engagement device in which a failure occurs is engaged; and engage the engagement device working properly if the engagement device in which a failure occurs is disengaged.

Thus, the drive force control system according to the embodiment of the present disclosure comprises the two engagement devices to connect any two of the rotary elements of the differential mechanism or connect any one of the rotary elements to the stationary member. In the drive force control system, the normally stay clutch is used as at least one of the engagement device. That is, if the signal transmission to the normally stay clutch is stopped due to failure during propulsion while engaging the other engagement device, a current engagement state of the normally stay clutch is maintained. According to the embodiment, therefore, the operating mode of the vehicle will not be shifted unintentionally due to failure. For this reason, a torque amplification factor of the torque delivered from the engine to the output member will not be changed in the event of failure of the engagement device, and hence a shock resulting from the failure of the clutch can be reduced.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 4 is a table showing engagement states of engagement devices and operating conditions of the prime movers in each operating mode;

DETAILED DESCRIPTION OF THE PREFERRED EMBODIMENT(S)

Figure 1:
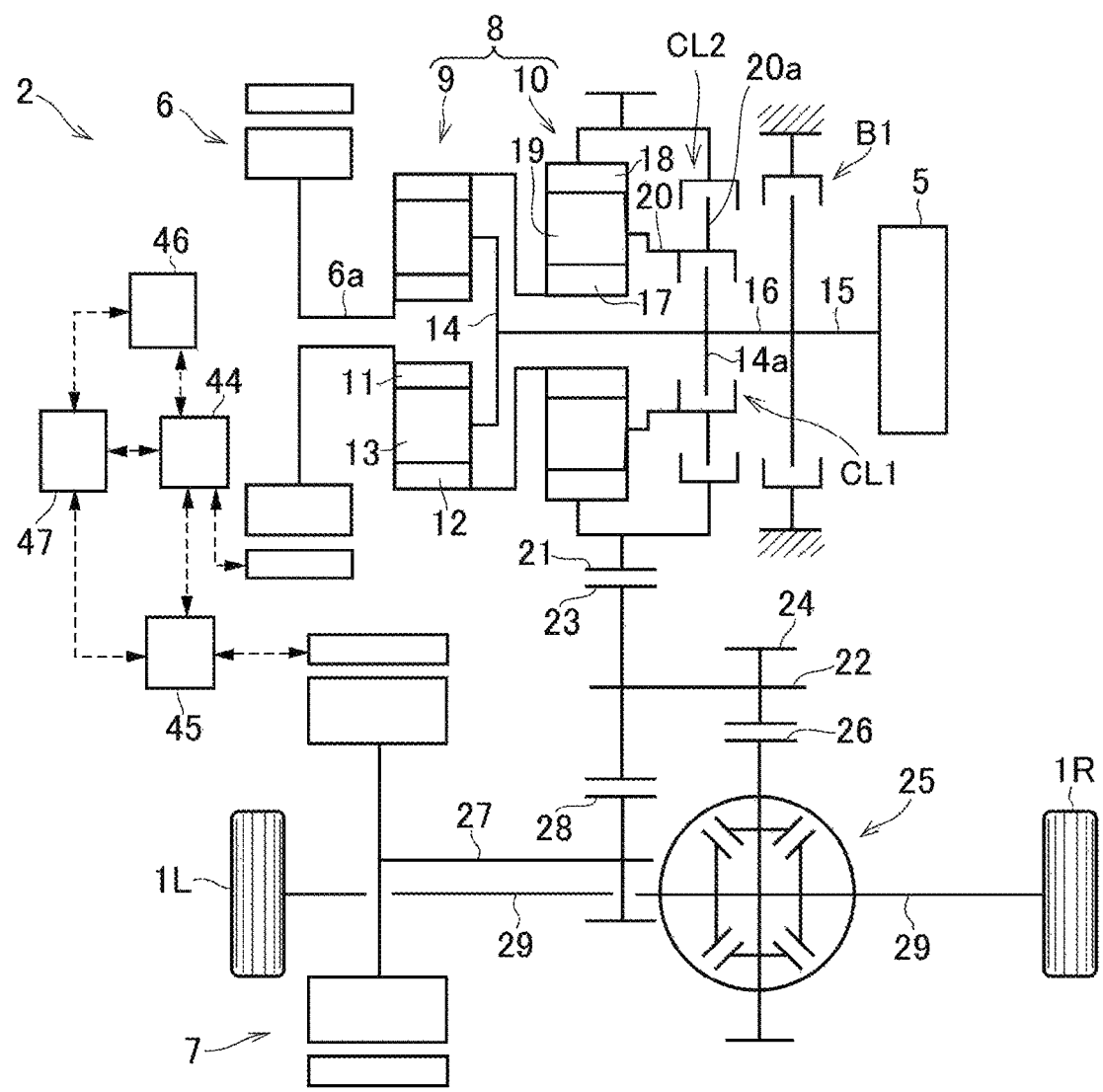
FIG. 1 is a skeleton diagram showing one example of a first drive unit.
Figure 2:
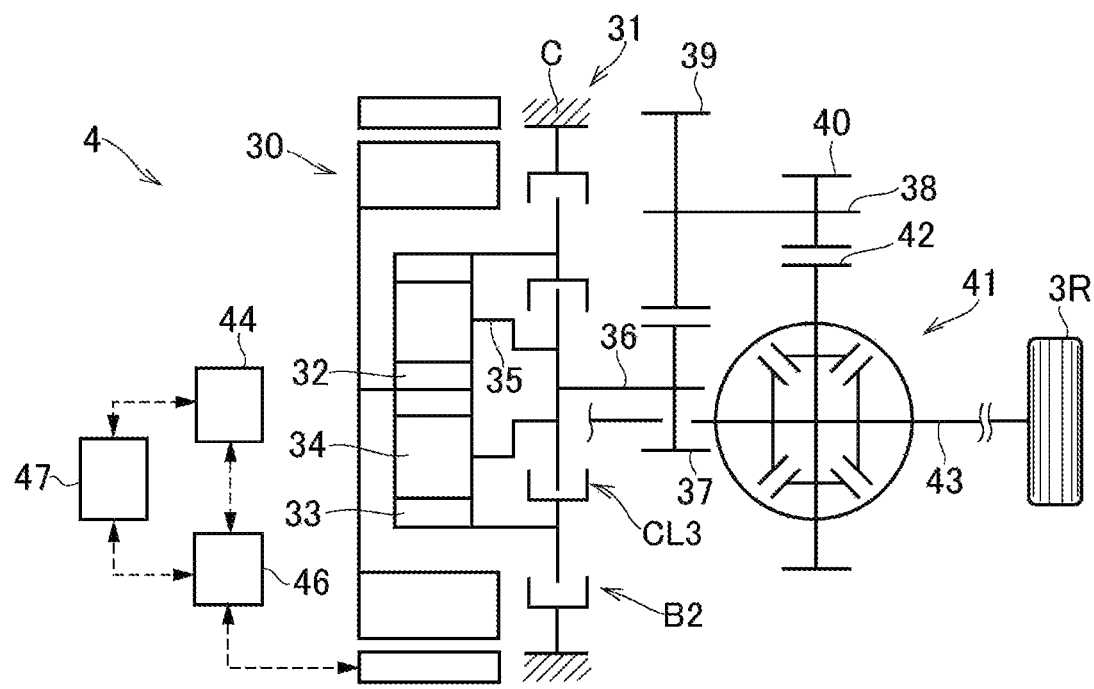
FIG. 2 is a skeleton diagram showing one example of a second drive unit.

Preferred embodiments of the present disclosure will now be explained with reference to the accompanying drawings. Referring now to FIGS. 1 and 2, there are shown the first embodiment of a hybrid vehicle (as will be simply called "the vehicle" hereinafter) according to the present disclosure. Specifically, FIG. 1 shows a first drive unit 2 that drives a pair of front wheels 1R and 1L, and FIG. 2 shows a second drive unit 4 that drives a pair of rear wheels 3R and 3L. The vehicle is provided with an engine 5, a first motor 6 (abbreviated as "MG1" in the drawings) and a second motor 7 (abbreviated as "MG2" in the drawings). Specifically, the first motor 6 is a motor-generator having a generating function. In the vehicle according to the first embodiment, a speed of the engine 5 is controlled by the first motor 6, and the second motor 7 is driven by electric power generated by the first motor 6 to generate a drive force for propelling the vehicle. Optionally, the second motor 7 may also be used as the motor-generator having a generating function. In the vehicle, accordingly, the first motor 6 serves as a first rotary machine, and the second motor 7 serves as a prime mover.

A power split mechanism 8 as a differential mechanism is connected to the engine 5. The power split mechanism 8 includes a power split section 9 that distributes the engine torque to the first motor side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the embodiment shown in FIG. 1, the power split section 9 and the first motor 6 are arranged concentrically with a rotational center axis of the engine 5, and the first motor 6 is situated on an opposite side of the engine 5 across the power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 with the carrier 14 of the power split section 9. Specifically, a rotary disc 14a is fitted onto the input shaft 16, and the first clutch CL 1 engages the rotary disc 14a selectively with the carrier 20 of the transmission section 10. For example, a wet-type multiple plate clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element. That is, the complex planetary gear unit is configured so that the input shaft 16, the output shaft 6a of the first motor 6 and the driven gear 23 can be rotated in a differential manner.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. Specifically, a rotary disc 20a is provided to be rotated integrally with the carrier 20, and the second clutch CL 2 engages the rotary disc 20a selectively with the ring gear 18 of the transmission section 10.

Accordingly, the carrier 20 of the transmission section 10 serves as a first rotary element or a third rotary element, the carrier 14 of the power split section 9 serves as a second rotary element, the first clutch CL 1 serves as a first engagement device, the second clutch CL 2 serves as a second engagement device, the input shaft 16 serve as a first rotary member, the output shaft 6a of the first motor 6 serve as a second rotary member, the driven gear 23 serves as a third rotary element, and the pair of front wheels 1R and 1L serves as an output member.

The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a stationary member such as a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47.

Figure 3:
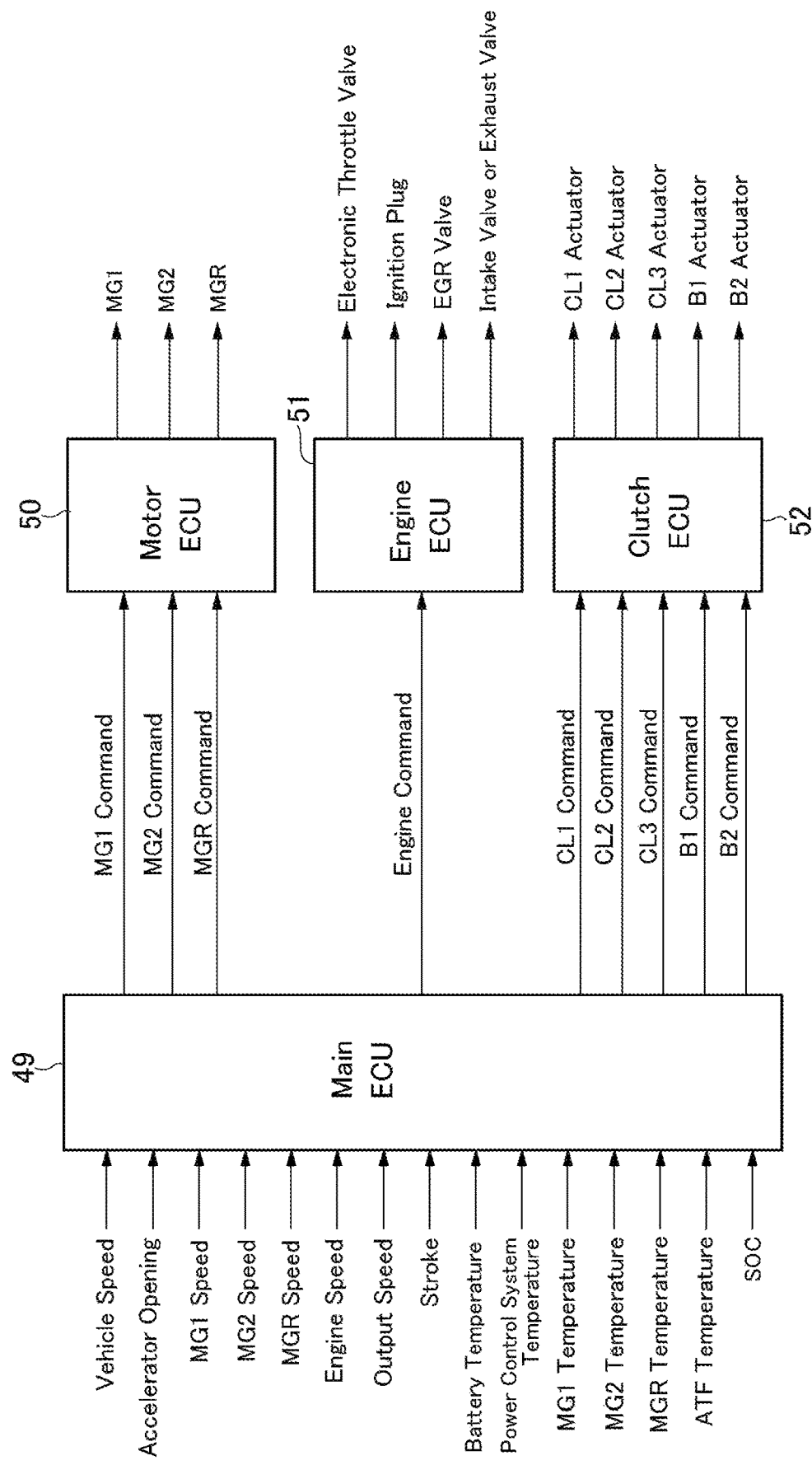
FIG. 3 is a block diagram showing a structure of an electronic control unit.

In order to control the first power control system 44, the second power control system 45, the third power control system 46, the engine 5, the clutches CL1, CL2, CL3, and the brakes B1,B2, the hybrid vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50 (abbreviated as "MG-ECU" in the drawings), an engine ECU 51, and a clutch ECU 52.

The main ECU 49 is configured to execute a calculation based on incident data from sensors as well as maps and formulas installed in advance, and transmits a calculation result to the motor ECU 50, the engine ECU 51, and the clutch ECU 52 in the form of command signal. For example, as shown in FIG. 3, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the ECUs 44, 45, and 46; a temperature of the first motor 6; a temperature of the second motor 7; a temperature of the rear motor 30; a temperature of oil (i.e., ATF) lubricating the power split mechanism 8 and the transmission 31; and a state of charge (to be abbreviated as the "SOC" hereinafter) level of the battery 47.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the hybrid vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

In the hybrid vehicle according to the embodiment, an operating mode may be selected from a hybrid mode (to be abbreviated as the "HV mode" hereinafter) in which the hybrid vehicle is propelled by a drive torque generated by the engine 5, and an electric vehicle mode (to be abbreviated as the "EV mode" hereinafter) in which the hybrid vehicle is propelled by drive torques generated by the first motor 6 and the second motor 7 without using the engine 5. The HV mode may be selected from a hybrid-low mode (to be abbreviated as the "HV-Lo mode" hereinafter), a hybrid-high mode (to be abbreviated as the "HV-Hi mode" hereinafter), and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 is reduced lower than a rotational speed of the ring gear 18 of the transmission section 10 when a rotational speed of the first motor 6 is reduced substantially to zero. Further, in the fixed mode, the engine 5 and the ring gear 18 of the transmission section 10 are always rotated at substantially same speeds.

The EV mode may be selected from a dual-motor mode in which both of the first motor 6 and the second motor 7 generate drive torques to propel the hybrid vehicle, and a single-motor mode in which only the second motor 7 generates a drive torque to propel the hybrid vehicle. Further, the dual-motor mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor. In the single-motor mode, the hybrid vehicle is powered only by the second motor 7, while engaging the first clutch CL1, while engaging the second clutch CL2, or while disengaging both of the first clutch CL1 and the second clutch CL2.

FIG. 4 shows engagement states of the first clutch CL1, the second clutch CL2, and the first brake B1, and operating conditions of the first motor 6, the second motor 7, and the engine 5 in each operating mode. In FIG. 4, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 5:
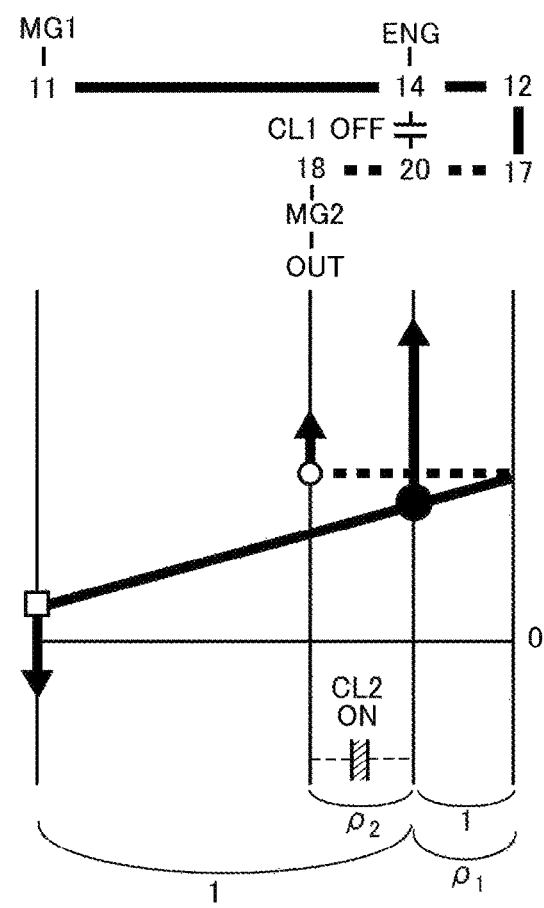
FIG. 5 is a nomographic diagram showing a situation in a HV-Hi mode.
Figure 6:
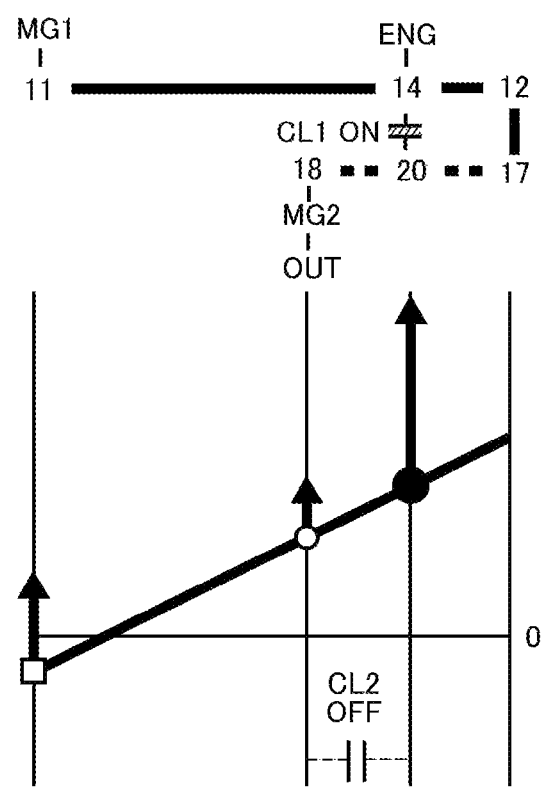
FIG. 6 is a nomographic diagram showing a situation in a HV-Lo mode.

As indicated in FIG. 5, in the HV-Hi mode, the second clutch CL2 is engaged, and the engine 5 generates a drive torque while establishing a reaction torque by the first motor 6. As indicated in FIG. 6, in the HV-Lo mode, the first clutch CL1 is engaged, and the engine 5 generates a drive torque while establishing a reaction torque by the first motor 6. In the HV-Hi mode and the HV-Lo mode, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. The reaction torque established by the first motor 6 is governed by a split ratio of the torque transmitted from the engine 5 to the first motor 6 side through the power split mechanism 8. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\rho 1 \cdot \rho 2)$", and a ratio of the torque applied to the ring gear 18 in the HV-Hi mode may be expressed as "$1/(\rho 1)$". In other words, given that the torque of the engine 5 is "1", a ratio of the torque of the engine 5 delivered to the ring gear 18 in the HV-Lo mode may be expressed as "$1/(1-(\rho 1 \cdot \rho 2)+1)$", and a ratio of the torque of the engine 5 delivered to the ring gear 18 in the HV-Hi mode may be expressed as "$1/(\rho 1+1)$". In the above-expressed expressions, "$\rho 1$" is a gear ratio of the power split section 9 (i.e., a ratio between teeth number of the ring gear 12 and teeth number of the sun gear 11), and "$\rho 2$" is a gear ratio of the transmission section 10 (i.e., a ratio between teeth number of the ring gear 18 and teeth number of the sun gear 17). Specifically, "$\rho 1$" and "$\rho 2$" are individually smaller than "1". That is, in the HV-Lo mode, a ratio of the torque delivered to the ring gear 18 is increased in comparison with that in the HV-Hi mode. Accordingly, "$1/(1-(\rho 1 \cdot \rho 2)+1)$" corresponds to a first predetermined ratio of the embodiment, and "$1/(\rho 1+1)$" corresponds to a second predetermined ratio of the embodiment. Further, HV-Lo mode corresponds to a first mode of the embodiment, and HV-Hi mode corresponds to a second mode of the embodiment. Here, when the speed of the engine 5 is increased by the torque generated by the engine 5, the output torque of the engine 5 is calculated by subtracting a torque required to increase the speed of the engine 5 from a torque generated by the engine 5.

In the HV mode, the electric power generated by the first motor 6 is supplied to the second motor 7, and in addition, the electric power accumulated in the battery 47 is also supplied to the second motor 7 as necessary. In the hybrid vehicle, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained.

Figure 7:
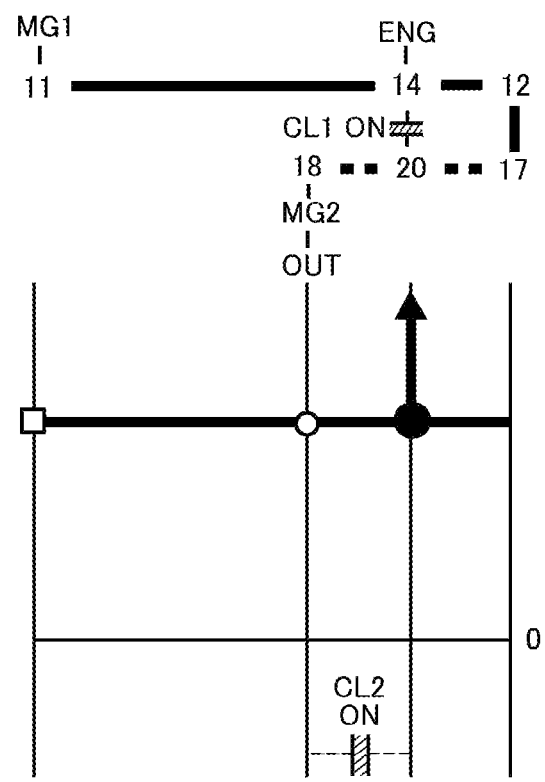
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. In other words, the output power of the engine 5 will not be translated into an electric energy by the first motor 6 and the second motor 7. For this reason, a power loss associated with such energy conversion will not be caused in the fixed mode and hence power transmission efficiency can be improved.

Figure 8:
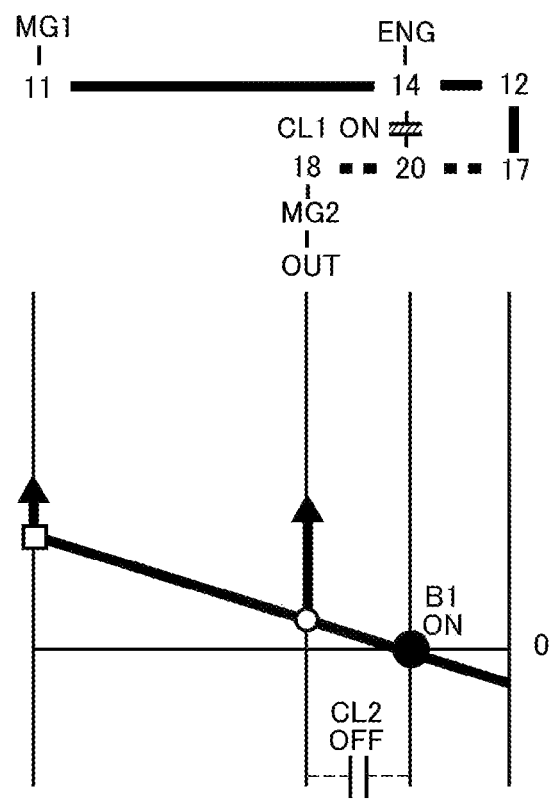
FIG. 8 is a nomographic diagram showing a situation in an EV-Lo mode.
Figure 9:
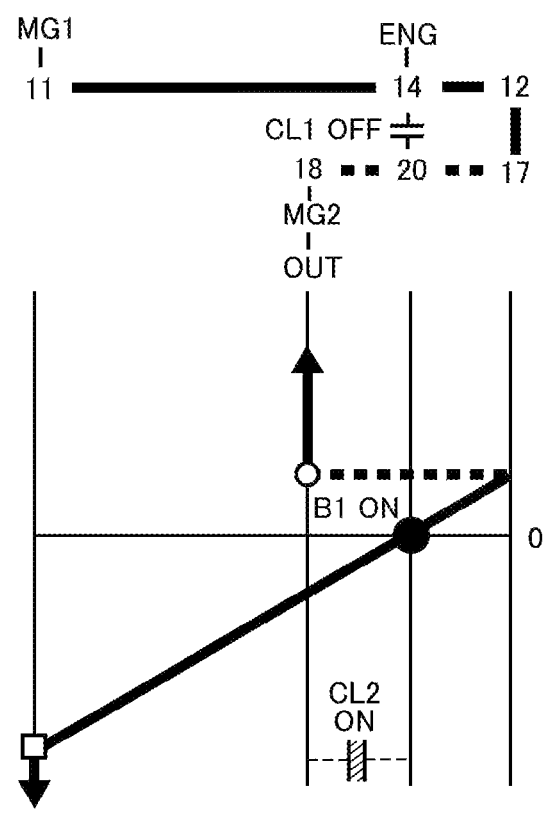
FIG. 9 is a nomographic diagram showing a situation in an EV-Hi mode.
Figure 10:
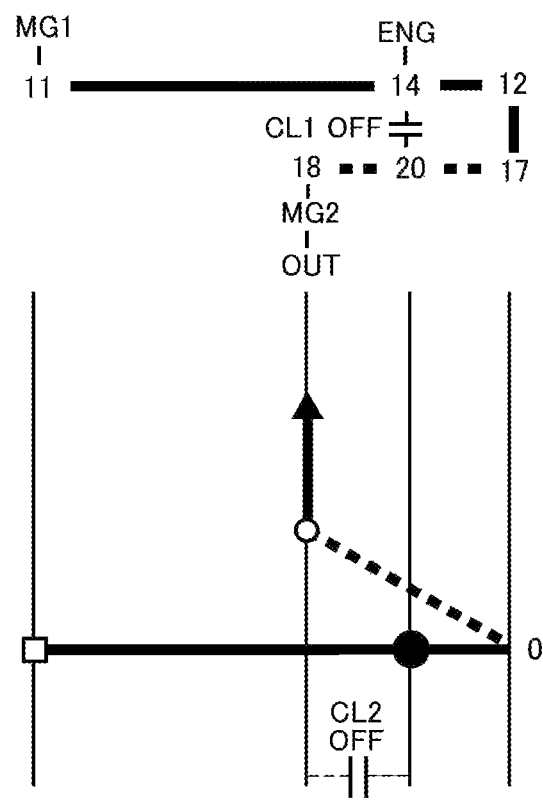
FIG. 10 is a nomographic diagram showing a situation in a single-motor mode.

As indicated in FIGS. 8 and 9, in the EV-Lo mode and the EV-Hi mode, the first brake B1 is engaged, and the first motor 6 and the second motor 7 generates the drive torques to propel the hybrid vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the HV-Lo mode is greater than that in the HV-Hi mode so that a greater drive force is established in the EV-Lo mode. As indicated in FIG. 10, in the single-motor mode, only the second motor 7 generates a drive torque, and both of the clutch CL1 and the second clutch CL2 are disengaged. In the single-motor mode, therefore, all of the rotary elements of the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the hybrid vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
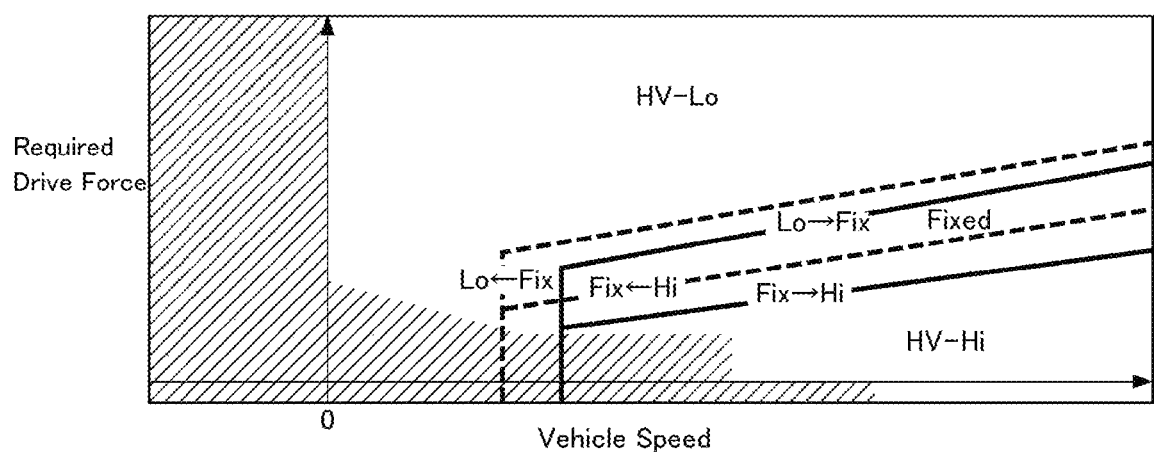
FIG. 11 shows a map for determining an operating mode during propulsion in a CS mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the single-motor mode is selected. In the CS mode, the single-motor mode is selected when the hybrid vehicle is propelled in a reverse direction irrespective of the required drive force, and when the hybrid vehicle is propelled in a forward direction and the required drive force is small (or when decelerating). Such area where the single-motor mode is selected is determined based on specifications of the second motor 7 and the rear motor 30.

During forward propulsion in the CS mode, the HV mode is selected when the large drive force is required. In the HV mode, the drive force may be generated from a low speed range to a high speed range. When the SOC level falls close to a lower limit level, therefore, the HV mode may be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lo-Fix" line from right to left, or when the operating point is shifted across the "Lo-Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 12:
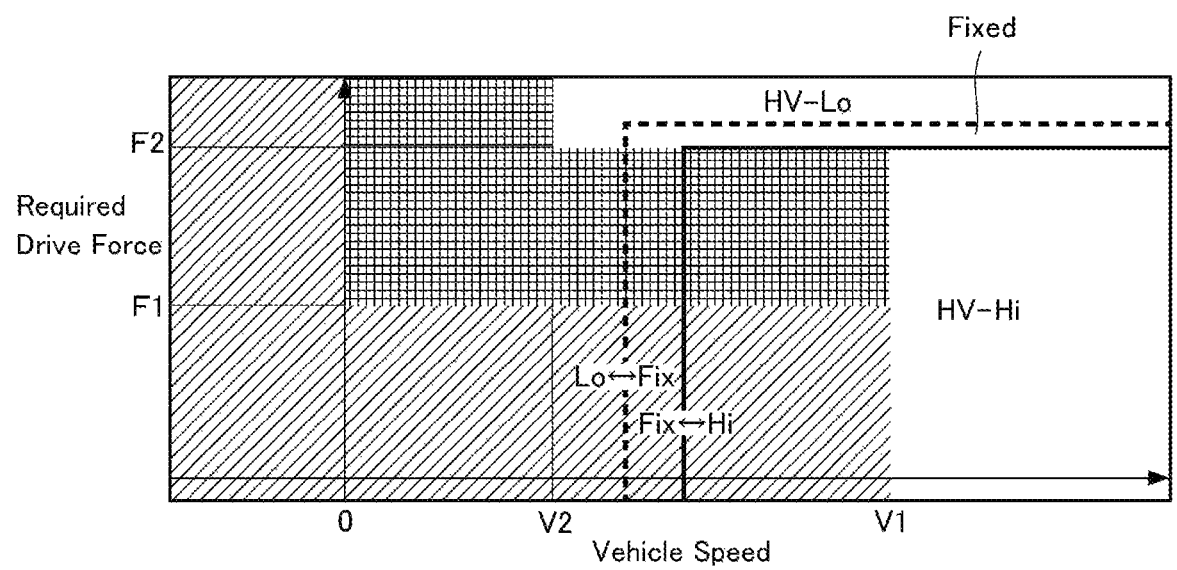
FIG. 12 shows a map for determining an operating mode during propulsion in a CD mode.

FIG. 12 shows an example of a map used to select the operating mode during propulsion in the CD mode. In FIG. 12, the vertical axis also represents the required drive force, and the horizontal axis also represents the vehicle speed.

In FIG. 12, the hatched area is also an area where the single-motor mode is selected. In the CD mode, the single-motor mode is selected when the hybrid vehicle is propelled in a reverse direction irrespective of the required drive force, and when the hybrid vehicle is propelled in a forward direction and the required drive force is smaller than a first threshold force value F1 (or when decelerating). Such area where the single-motor mode is selected is also determined based on specifications of the second motor 7 and the rear motor 30.

During forward propulsion in the CD mode, the dual-motor mode is selected when the drive force greater than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated from the low speed range to the high speed range in the HV mode. When the SOC level of the battery 47 falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo↔Fix" line. Likewise, the operating mode is shifted from the HV-Hi mode and the fixed mode when the operating point is shifted across the "Fix↔Hi".

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

A normally open clutch may be used individually as the first clutch CL1 and the second clutch CL2. In addition, a normally close clutch may also be used individually as the first clutch CL1 and the second clutch CL2. Otherwise, the normally open clutch may be used as any one of the first clutch CL1 and the second clutch CL2, and the normally close clutch may be used as the other one of the first clutch CL1 and the second clutch CL2. If a required hydraulic pressure or electricity cannot be supplied to those clutches due to failure, the operating mode of the vehicle may be shifted unintentionally. Consequently, a torque amplification factor of the torque delivered from the engine 5 to the front wheels 1R and 1L may be changed thereby generating a shock.

Specifically, the normally open clutch is engaged to transmit a torque therethrough by applying a hydraulic pressure or electricity higher than a predetermined level thereto, and released or disengaged when the hydraulic pressure or electricity is reduced lower than the predetermined level. In other words, the normally open clutch is engaged when an engagement command signal is applied, and disengaged when the command signal is not applied. By contrast, the normally close clutch is engaged to transmit a torque therethrough when a hydraulic pressure or electricity applied thereto is lower than a predetermined level, and released or disengaged by applying the hydraulic pressure or electricity higher than the predetermined level thereto. In other words, the normally close clutch is disengaged when a disengagement command signal is applied, and engaged when the command signal is not applied.

For example, in a case that the normally open clutch is used individually as the first clutch CL1 and the second clutch CL2, and some kind of failure occurs in an actuator to actuate the second clutch CL2 during propulsion in the HV-Hi mode, a required control amount to engage the second clutch CL2 cannot be maintained, and hence the second clutch CL2 is disengaged unintentionally. Consequently, the operating mode is shifted from the HV-Hi mode to the HV-Lo mode thereby causing a shock.

By contrast, in a case that the normally close clutch is used individually as the first clutch CL1 and the second clutch CL2, and some kind of failure occurs in an actuator to actuate the first clutch CL1 during propulsion in the HV-Hi mode, a required control amount to disengage the first clutch CL1 cannot be maintained, and hence the first clutch CL1 is engaged unintentionally. Consequently, the operating mode is shifted from the HV-Hi mode to the fixed mode thereby causing a shock.

Thus, if the required control amount to keep the normally open clutch in engagement or to keep the normally open clutch in disengagement due to some kind of failure, the operating mode is shifted unintentionally while causing a shock.

In order to prevent such disadvantage, according to the embodiment, a normally stay clutch is used as at least one of the first clutch CL1 and the second clutch CL2. The normally stay clutch is actuated by an actuator to be engaged upon reception of an engagement command signal e.g., from the clutch ECU 52, and to be disengaged upon reception of a disengagement command signal e.g., from the clutch ECU 52. For example, in a case that the normally stay clutch is engaged, the normally stay clutch stays in engagement even if the signal transmission thereto is interrupted and hence the actuator stops actuating the normally stay clutch. By contrast, in a case that the normally stay clutch is disengaged, the normally stay clutch stays in disengagement even if the signal transmission thereto is interrupted and hence the actuator stops actuating the normally stay clutch. Thus, an engagement state of the normally stay clutch is switched upon reception of the command signal, and the normally stay clutch stays in the current engagement state even if the signal transmission thereto is interrupted, or in the event of failure of the actuator or the clutch itself.

Figure 13:
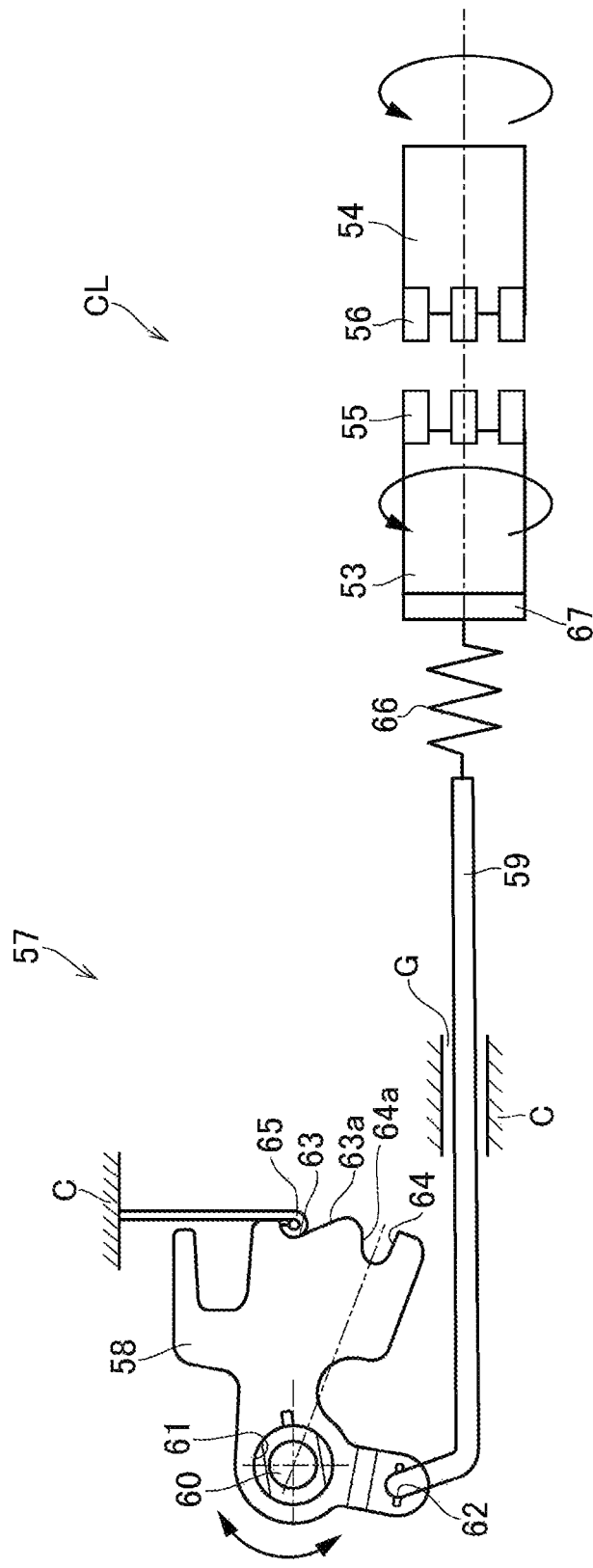
FIG. 13 is a schematic illustration showing a structure of a normally stay clutch.

An example of a structure of the normally stay clutch is shown in FIG. 13. The normally stay clutch CL shown in FIG. 13 may be used not only as the first clutch CL1 but also the second clutch CL2. Specifically, the normally stay clutch CL is a dog clutch having a pair of rotary members 53 and 54. Dog teeth 55 are formed on the rotary member 53 and dog teeth 56 are formed on the rotary member 54 while being opposed to each other, and the normally stay clutch CL is allowed to transmit torque therethrough by engaging the dog teeth 55 with the dog teeth 56. Given that the normally stay clutch CL is used as the first clutch CL1, one of the rotary members 53 and 54 serves as a rotary disc 14a, and other one of the rotary member 53 or 54 serves as the carrier 20. By contrast, given that the normally stay clutch CL is used as the second clutch CL2, one of the rotary members 53 and 54 serves as a rotary disc 20a, and other one of the rotary member 53 or 54 serves as the ring gear 18.

The rotary member (to be called the "first rotary member hereinafter) 53 is pushed toward and withdrawn away from the rotary member (to be called the "second rotary member hereinafter) 54 by an actuator 57. Specifically, the actuator 57 includes a motor (not shown), a plate 58 rotated by a torque of the motor, a rod 59 that is reciprocated by a rotation of the plate 58 to push and withdraw the first rotary member 53 toward/away from the second rotary member 54.

The plate 58 comprises a through hole 61 to which a shaft 60 to transmit the torque of the motor is inserted, a through hole 62 which is formed radially away from a rotational center of the plate 58, and a first depression 63 and a second depression 64 individually formed away from the through hole 62 in the rotational direction while being depressed toward the rotational center of the plate 58. One of end portions of the rod 59 is inserted into the through hole 62.

In order to rotate the plate 58 together with the shaft 60, a key ridge is formed on the shaft 60 and a key groove engaged with the key ridge is formed in the through hole 61. The through hole 62 and said one of the end portion of the rod 59 are allowed to rotate relatively to each other, and a stopper (not shown) is formed on a leading end of said one of the end portion of the rod 59.

A stopper member 65 is attached to the casing C, and an engagement portion formed on a leading end of the stopper member 65 is engaged with the first depression 63 or the second depression 64 to stop a rotation of the plate 58.

Specifically, the stopper member 65 is engaged with the first depression 63 when the first dog teeth 55 is situated at the furthermost position from the second dog teeth 56, and engaged with the second depression 64 when the first dog teeth 55 is engaged with the second dog teeth 56 to transmit torque. Inclinations of an inclined face 63a of the first depression 63 and an inclined face 64a of the second depression 64 are set in such a manner that the stopper member 65 is disengaged from the first depression 63 or the second depression 64 by the torque applied to the plate 58 from the motor, but disengaged from the first depression 63 or the second depression 64 by disturbance such as vibration of the vehicle. When the plate 58 is rotated by the torque applied from the motor, the stopper member 65 is elastically withdrawn from one of the first depression 63 and the second depression 64, and moved to the adjacent depression over a ridge formed by the inclined face 63a and the inclined face 64a.

The motor applies a torque to the plate 58 in accordance with an engagement command signal or a disengagement command signal. Consequently, the stopper member 65 is engaged selectably with the first depression 63 and the second depression 64 depending on a rotational direction of the plate 58. However, the stopper member 65 will not be disengaged from the first depression 63 or the second depression 64 by the disturbance such as vibration of the vehicle.

Specifically, said one of the end portion of the rod 59 is bent toward the plate 58 (i.e., upwardly in FIG. 13) and further bent to be inserted into the through hole 62 (i.e., in a thickness direction of the plate 58). An intermediate portion of the rod 59 is inserted into a guide groove (or a guide hole) G while being allowed to reciprocate therein, and a compression spring 66 is attached to a leading end of the other end portion of the rod 59. The compression spring 66 is further connected to the first rotary member 53 through a thrust bearing 67 so that the compression spring 66 and the first rotary member 53 are allowed to rotate relatively to each other. That is, a load of the compression spring 66 is applied to the first rotary member 53 through the thrust bearing 67. Specifically, an axial force of the rod 59 established by a torque of the plate 58 is transmitted to the first rotary member 53 through the compression spring 66 and the thrust bearing 67.

Thus, the normally stay clutch CL can maintain the current engagement state even when the torque cannot be applied to the plate 58 due to a failure on the motor or an electric circuit for controlling the motor. As described, according to the embodiment, the normally stay clutch CL is used as at least one of the first clutch CL1 and the second clutch CL2. According to the embodiment, therefore, the operating mode will not be shifted unintentionally in the event of failure of the normally stay clutch CL. For this reason, a torque amplification factor of the torque delivered from the engine 5 to the front wheels 1R and 1L will not be changed even if a failure occurs in the normally stay clutch CL. That is, a shock resulting from the failure of the clutch can be reduced.

Such unintentional mode change resulting from failure of the clutch can be prevented certainly by using the normally stay clutch CL as both of the first clutch CL1 and the second clutch CL2.

When a failure occurs in the electric circuit to control electric supply to the motor, or when an unintentional command is transmitted from the controller (e.g., from the clutch ECU 52), the motor may generate a torque unintentionally. In this situation, if the first rotary member 53 and the second rotary member 54 are rotate relatively to each other, leading ends of the first dog teeth 55 may be contacted to leading ends of the second dog teeth 56, and hence the first dog teeth 55 may not be engaged properly with the second dog teeth 56. In this situation, therefore, the first dog teeth 55 and the second dog teeth 56 may be damaged if engaged to each other by an excessive load. In addition, an engagement shock may be increased by a contact between the first dog teeth 55 and the second dog teeth 56. In the normally stay clutch CL, however, such load applied to the first dog teeth 55 and the second dog teeth 56 and friction acting the first dog teeth 55 and the second dog teeth 56 may be absorbed by the compression spring 66. For this reason, engagement shock can be suppressed and damage on the first dog teeth 55 and the second dog teeth 56 can be limited.

A structure of the normally stay clutch CL should not limited to that shown in FIG. 13. For example, depression may also be formed on the rod 59. In this case, an engagement state of the normally stay clutch CL is maintained by inserting a pin into the depression by reciprocating the pin by an actuator. In addition, the first rotary member 53 and the second rotary member 54 may also be engaged frictionally instead of employing the dog teeth. In this case, the normally stay clutch CL may be provided with a mechanism for restricting a position of a member to push a friction plate to maintain a current engagement state. Further, the actuator 57 may also be actuated hydraulically instead of using the motor. In this case, the normally stay clutch CL may be provided with a poppet valve in a hydraulic circuit to suppress fluctuation of a f pressure in a hydraulic chamber.

In the case that the normally stay clutch CL is used as one of the first clutch CL1 and the second clutch CL2, and the normally open clutch is used as the other one of the first clutch CL1 or the second clutch CL2, the power split mechanism 8 will be brought into the neutral stage in the event of failure of the normally open clutch. In this case, although a shock will be caused by a temporal reduction in acceleration, such shock is smaller than the shock resulting from the unintentional engagement of the clutch. That is, the shock resulting from the unintentional engagement of the clutch can be reduce in comparison with that of a case in which the normally close clutch is used as the e other one of the first clutch CL1 or the second clutch CL2.

In this case, if the command signal cannot be transmitted to both of the normally stay clutch and the normally open clutch due to failure during propulsion while engaging the normally stay clutch and disengaging and the normally open clutch, torque cannot be delivered from the engine 5 to the front wheels 1R and 1L. However, in the first drive unit 2 shown in FIG. 1, the vehicle is still allowed to be propelled by the torque of the second motor 7 delivered to the front wheels 1R and 1L without passing through the power split mechanism 8. That is, the vehicle is allowed to evacuate by another prime mover irrespective of engagement states of the first clutch CL1 and the second clutch CL2. Here, the vehicle is allowed to evacuate by another prime mover in the event of failure of the clutches even in a case that the normally stay clutch is individually used as the first clutch CL1 and the second clutch CL2.

In the case that the normally stay clutch CL is used as one of the first clutch CL1 and the second clutch CL2, and the normally close clutch is used as the other one of the first clutch CL1 or the second clutch CL2, if the command signal cannot be transmitted to both of the normally stay clutch and the normally close clutch due to failure during propulsion while disengaging the normally stay clutch and engaging and the normally close clutch, the normally close clutch will be brought into engagement. In this case, the engine torque still can be delivered to the front wheels 1R and 1L to allow the vehicle to evacuate, even if the SOC level of the battery 47 is low.

Figure 14:
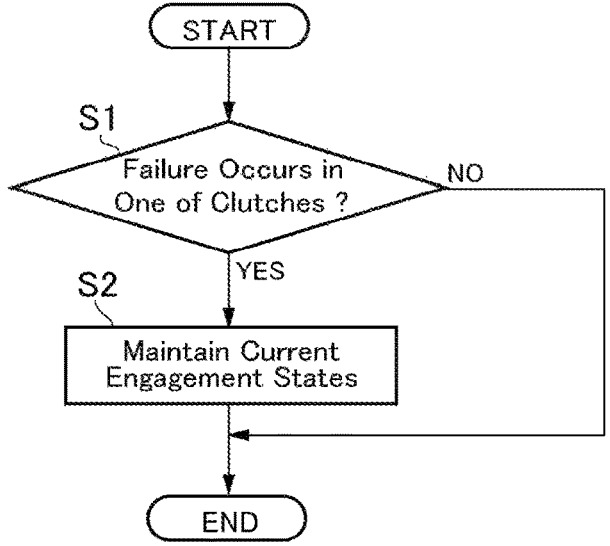
FIG. 14 is a flowchart showing a routine executed in the HV-Hi mode and the HV-Lo mode.

Here will be explained a routine to be executed in a situation in which the normally stay clutch is individually used as the first clutch CL1 and the second clutch CL2, and the command signals cannot be transmitted to the first clutch CL1 and the second clutch CL2 due to failure, with reference to FIG. 14. Specifically, the routine shown in FIG. 14 is executed during propulsion in the HV-Hi mode or the HV-Lo mode. At step S1, it is determined whether or not a failure occurs in any one of the first clutch CL1 and the second clutch CL2. Such determination at step S1 may be made based on a detection signal from a rotational angle sensor that detects a rotational angle of the plate 58. Specifically, an occurrence of a failure in the clutch may be determined based on a fact that the rotational angle of the plate 58 is not detected by the sensor in spite of transmitting the engagement command or the disengagement command to the clutch. In addition, an occurrence of a failure in the clutch may be determined if a short circuit of the electric circuit connected to the motor is detected.

If a failure occurs in none of the first clutch CL1 and the second clutch CL2 so that the answer of step S1 is NO, the routine returns. In this case, the first clutch CL1 and the second clutch CL2 are controlled by a normal procedure. By contrast, if a failure occurs in any one of the first clutch CL1 and the second clutch CL2 so that the answer of step S1 is YES, the routine progresses to step S2 to maintain current engagement states of the clutches, and thereafter returns. That is, current operating mode is maintained. In other words, in the case that the answer of step S1 is YES, transmission of the engagement command signal or the disengagement command signal to the clutches is stopped.

Thus, the operating mode will not be shifted in the event of failure during propulsion in the HV-Hi mode or the HV-Lo mode. In the fixed mode, if the vehicle speed is reduced lower than a self-sustaining speed, the engine 5 may not be driven. In the EV mode, if the SOC level of the battery falls excessively, a large drive force cannot be generated and the vehicle may not be propelled. According to the embodiment, therefore, the HV mode is selected on a priority basis in the event of failure of the clutch so as to generate the drive force in a wider operating range, and to propel the vehicle by both fuel and electricity. In order to maintain the operating mode to the HV-Hi mode or the HV-Lo mode in the event of failure of the clutch, it is preferable to use the normally open clutch as the first brake B1.

Figure 15:
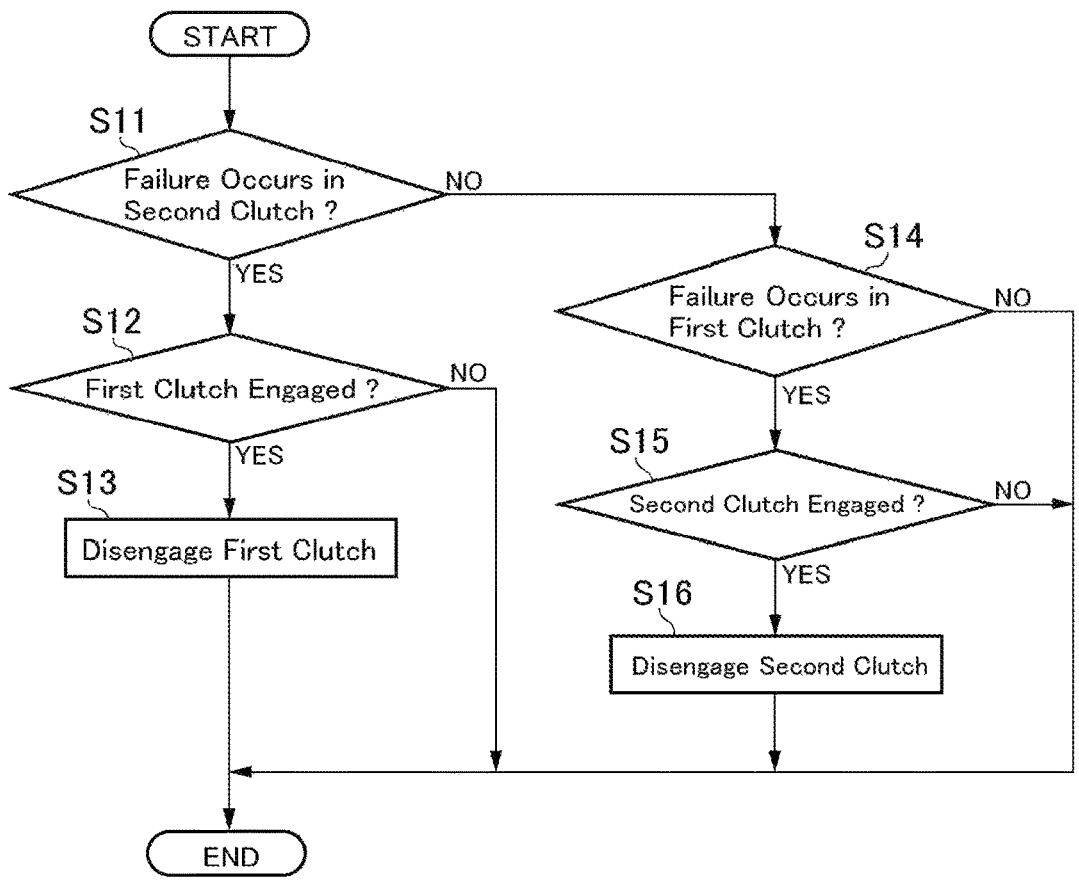
FIG. 15 is a flowchart showing a routine executed in the fixed mode.

FIG. 15 shows a routine executed during propulsion in the fixed mode. At step S11, it is determined whether or not a failure occurs in the second clutch CL2. Such determination may be made by the same manner as above-explained step S1.

If a failure occurs in the second clutch CL2 so that the answer of step S11 is YES, the routine progresses to step S12 to determine whether or not the first clutch CL1 is in engagement. Since the vehicle is currently propelled in the fixed mode, the first clutch CL1 is engaged when the failure occurs in the second clutch CL2, and hence the routine progresses to step S12. If the first clutch Cl1 has already been disengaged by executing below-mentioned step S13 so that the answer of step S12 is NO, the routine returns. For example, engagement of the first clutch CL1 may be determined by detecting a travel amount of the first rotary member 53. Alternatively, the engagement of the first clutch CL1 may also be determined based on a fact that a relative rotation is not caused between the carrier 14 of the power split section 9 and the carrier 20 of the transmission section 10.

By contrast, if the first clutch CL1 is engaged so that the answer of step S12 is YES, the routine progresses to step S13 to disengage the first clutch CL1, and thereafter returns. Consequently, the operating mode is shifted from the fixed mode to the HV-Hi mode irrespective of the operating point. In this case, for example, the operating mode may be shifted to the HV-Hi mode by merely transmitting the disengagement command signal to the first clutch CL1 while selecting the fixed mode in the control. Instead, it is also possible to shift the operating mode to the HV-Hi mode by selecting the HV-Hi mode by the control. As described, if the first clutch CL1 has already been disengaged at step S13 so that the answer of step S12 is NO, the routine returns.

Otherwise, if a failure does not occurs in the second clutch CL2 so that the answer of step S11 is NO, the routine progresses to step S14 to determine whether or not a failure occurs in the first clutch CL1. Such determination may be made by the same manner as above-explained step S14.

If a failure does not occur in the first clutch CL1 so that the answer of step S14 is NO, this means that both of the first clutch CL1 and the second clutch CL2 may be operated properly. In this case, therefore, the routine returns, and the first clutch CL1 and the second clutch CL2 are controlled by the normal control. By contrast, if a failure occurs in the first clutch CL1 so that the answer of step S14 is YES, the routine progresses to step S15 to determine whether or not the second clutch CL2 is engaged. Since the vehicle is currently propelled in the fixed mode, the second clutch CL2 is engaged when the failure occurs in the first clutch CL1, and hence the routine progresses to step S16. If the second clutch CL2 has already been disengaged by executing below-mentioned step S16 so that the answer of step S15 is NO, the routine returns. Engagement of the second clutch CL2 may be determined by the same manner as above-explained step S13.

By contrast, if the second clutch CL2 is engaged so that the answer of step S15 is YES, the routine progresses to step S16 to disengage the second clutch CL2, and thereafter returns. Consequently, the operating mode is shifted from the fixed mode to the HV-Lo mode irrespective of the operating point. In this case, for example, the operating mode may be shifted to the HV-Lo mode by merely transmitting the disengagement command signal to the second clutch CL2 while selecting the fixed mode in the control. Instead, it is also possible to shift the operating mode to the HV-Lo mode by selecting the HV-Lo mode by the control. As described, if the second clutch CL2 has already been disengaged at step S16 so that the answer of step S15 is NO, the routine returns.

Figure 16:
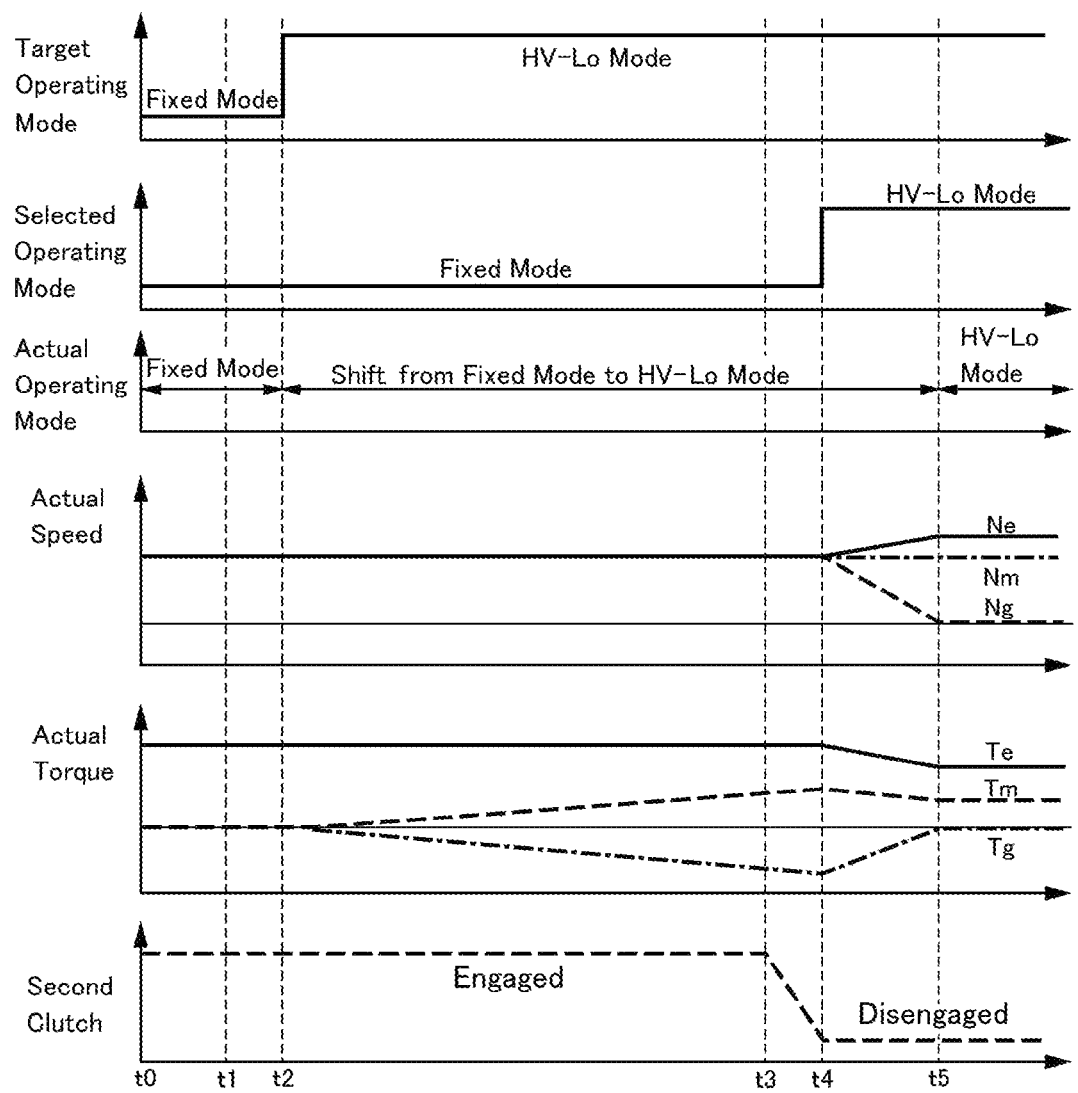
FIG. 16 is a time chart indicating changes in speeds and torques of the engine and the motors, and an engagement state of a second clutch during execution of the routine shown in FIG. 15.

FIG. 16 shows temporal changes in speeds of the engine 5, the first motor 6, and the second motor 7 (Ne, Ng, Nm), torques of the engine 5, the first motor 6, and the second motor 7 (Te, Tg, Tm), and an engagement state of the second clutch CL2 during execution of the routine shown in FIG. 15. Specifically, FIG. 16 shows a situation in which the first clutch CL1 cannot be disengaged during propulsion in the fixed mode. In addition, temporal changes in the target operating mode, the currently selected operating mode (as will be simply called the "selected operating mode, and the actual operating mode are also shown in FIG. 16. In FIG. 16, the gear ratio is indicated as "1" for the sake of convenience.

At point to, the first clutch CL1 and the second clutch CL2 work properly and hence a failure has not yet been detected.

At point t0, therefore, the target operating mode, the current operating mode, and the actual operating mode are in the fixed mode. In this situation, the engine 5, the first motor 6, and the second motor 7 are rotated at a same speed, and the engine 5 generates a torque to achieve a required drive force. On the other hand, the first motor 6 and the second motor 7 do not generate torques, and the second clutch CL2 is engaged.

At point t1, a failure of the first clutch CL1 is detected and the routine shown in FIG. 15 progresses from step S14 to S15. Consequently, the second clutch CL2 is disengaged. In this situation, if the second clutch CL2 is subjected to a torque, a frictional resistance acting between the first dog teeth 55 and the second dog teeth 56 would be increased. In order to prevent such disadvantage, the torque applied to the second clutch CL2 is reduced. To this end, the target operating mode is shifted to the HV-Lo mode at point t2. In addition, the first motor 6 starts generating a torque in a direction to reduce a rotational speed thereof, and the second motor 7 starts generating a torque in a direction to increase a rotational speed thereof. In other words, the second motor 7 starts generating a drive torque in such a manner as to reduce an output torque of the power split mechanism 8 while preventing a reduction in the drive force. At point t2, the actual operating mode is shifted from the fixed mode to the HV-Lo mode.

When the torque applied to the second clutch CL2 is reduced lower than a predetermined value at point t3, the disengagement command signal is transmitted to the second clutch CL2, and the disengagement of the second clutch CL2 is completed at point t4. Consequently, the selected operating mode is shifted to the HV-Lo mode. As described, in the HV-Lo mode, the rotational speed of the first motor 6 is controlled in such a manner to improve an operating efficiency of the first drive unit 2. To this end, specifically, the rotational speed of the first motor 6 is reduced from point t4 to increase the rotational speed of the engine 5.

In this situation, if the engine 5 continuously generates the same magnitude of the torque as before, an output power of the engine will be increased. In order to avoid such increase in the engine power, in this situation, the torque of the engine 5 is reduced with an increase in the rotational speed of the engine 5 to keep the engine torque constant. In this situation, the first motor 6 generates a total torque of: a reaction torque required to deliver the output power of the engine 5 to the front wheels 1R and 1L; and a torque required to increase the speed of the engine 5 and to reduce the speed of the first motor 6. In this situation, the second motor 7 does not generate torque.

When the speed of the engine 5 is raised to a target speed at point t5, operating conditions of the engine 5, the first motor 6, and the second motor 7 are maintained. At point t5, the actual operating mode is shifted to the HV-Lo mode.

Figure 17:
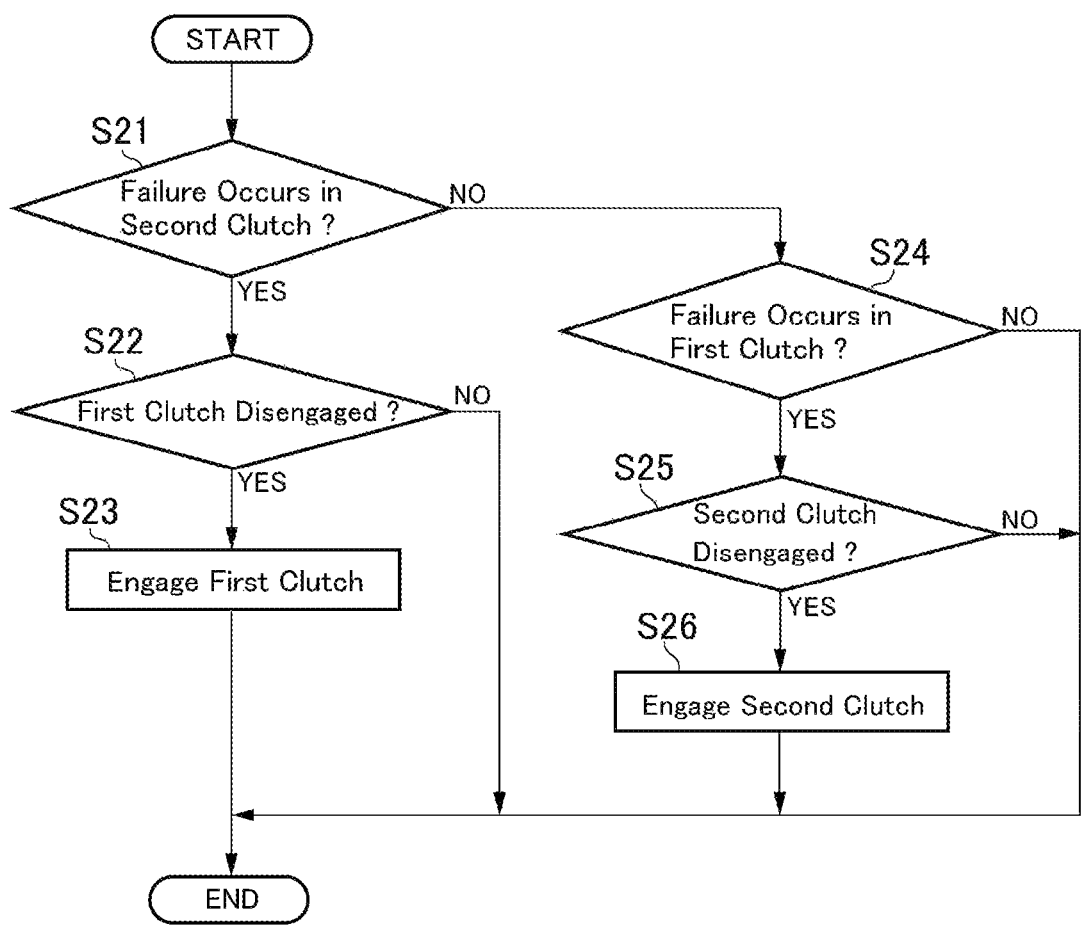
FIG. 17 is a flowchart showing a routine executed in the single-motor mode.

Turning to FIG. 17, there is shown shows a routine executed during propulsion in the single-motor mode in which both of the first clutch C11 and the second clutch CL2 are disengaged. At step S21, it is determined whether or not a failure occurs in the second clutch CL2. Such determination may be made by the same manner as above-explained steps S1 and S11.

If a failure occurs in the second clutch CL2 so that the answer of step S21 is YES, the routine progresses to step S22 to determine whether or not the first clutch CL1 is in disengagement. Since the vehicle is currently propelled in the single-motor mode, the first clutch CL1 is disengaged when the failure occurs in the second clutch CL2, and hence the routine progresses to step S22. If the first clutch Cl1 has already been engaged by executing below-mentioned step S23 so that the answer of step S22 is NO, the routine returns. For example, disengagement of the first clutch CL1 may be determined by detecting a travel amount of the first rotary member 53. Alternatively, disengagement of the first clutch CL1 may also be determined based on a fact that a relative rotation is caused between the carrier 14 of the power split section 9 and the carrier 20 of the transmission section 10.

If the first clutch Cl1 is disengaged so that the answer of step S22 is YES, the routine progresses to step S23 to engage the first clutch CL1, and thereafter returns. Consequently, the operating mode is shifted from the single-motor mode to the HV-Lo mode irrespective of the operating point. In this case, for example, the operating mode may be shifted to the HV-Lo mode by merely transmitting the engagement command signal to the first clutch CL1 while selecting the single-motor mode in the control. Instead, it is also possible to shift the operating mode to the HV-Lo mode by selecting the HV-Lo mode by the control. As described, if the first clutch CL1 has already been engaged at step S23 so that the answer of step S22 is NO, the routine returns.

Otherwise, if a failure does not occurs in the second clutch CL2 so that the answer of step S21 is NO, the routine progresses to step S24 to determine whether or not a failure occurs in the first clutch CL1. Such determination may be made by the same manner as above-explained steps S1 and S14.

If a failure does not occur in the first clutch CL1 so that the answer of step S24 is NO, this means that both of the first clutch CL1 and the second clutch CL2 may be operated properly. In this case, therefore, the routine returns, and the first clutch CL1 and the second clutch CL2 are controlled by the normal control. By contrast, if a failure occurs in the first clutch CL1 so that the answer of step S24 is YES, the routine progresses to step S25 to determine whether or not a the second clutch CL2 is disengaged. Since the vehicle is currently propelled in the single-motor mode, the second clutch CL2 is disengaged when the failure occurs in the first clutch CL1, and hence the routine progresses to step S26. If the second clutch CL2 has already been engaged by executing below-mentioned step S26 so that the answer of step S25 is NO, the routine returns. Disengagement of the second clutch CL2 may be determined by the same manner as above-explained step S23.

By contrast, if the second clutch CL2 is disengaged so that the answer of step S25 is YES, the routine progresses to step S26 to engage the second clutch CL2, and thereafter returns. Consequently, the operating mode is shifted from the single-motor mode to the HV-Hi mode irrespective of the operating point. In this case, for example, the operating mode may be shifted to the HV-Hi mode by merely transmitting the engagement command signal to the second clutch CL2 while selecting the single-motor mode in the control. Instead, it is also possible to shift the operating mode to the HV-HI mode by selecting the HV-HI mode by the control. As described, if the second clutch CL2 has already been engaged at step S26 so that the answer of step S25 is NO, the routine returns.

Thus, when a failure occurs in one of the clutches, the operating mode is shifted to the HV mode by manipulating the other clutch so that the vehicle is allowed to evacuate by delivering the engine torque to the front wheels 1R and 1L. In this situation, torque of the second motor 7 may be added to the torque delivered to the front wheels 1R and 1L. Instead, the vehicle may also be propelled by the torque of the second motor 7 while stopping the engine 5 and the first motor 6. That is, the vehicle may be propelled using not only fuel but also electricity. For this reason, a distance to empty to evacuate the vehicle may be elongated. In addition, since larger drive force can be generated in the HV mode, a running condition will not be restricted by the occurrence of the failure.

Although the above exemplary embodiments of the present application have been described, it will be understood by those skilled in the art that the present application should not be limited to the described exemplary embodiments, and various changes and modifications can be made within the spirit and scope of the present application. Hereinafter, modification examples of the hybrid vehicle will be explained with reference to FIGS. 18 to 23. In the following explanation, common reference numerals are allotted to in common with those of the foregoing embodiment, and detailed explanation for the common elements will be omitted.

Figure 18:
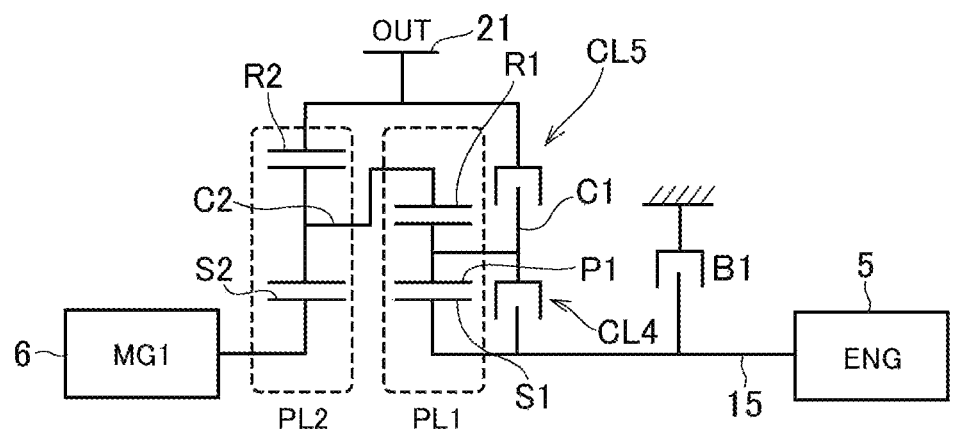
FIG. 18 is a skeleton diagram showing another example of a structure of the vehicle to which the control system according to the embodiment is applied.

The hybrid vehicle shown in FIG. 18 comprises a first differential mechanism PL1 connected directly to the engine 5, and a second differential mechanism PL2 connected directly to the first motor 6.

The first differential mechanism PL1 is a single-pinion planetary gear unit comprising: a sun gear S1 formed around the output shaft 15 of the engine 5 (or the input shaft 16); a ring gear R1 arranged concentrically with the sun gear S1; pinion gears P1 interposed between the sun gear S1 and the ring gear R1 while being meshed with both gears S1 and R1; and a carrier C1 supporting the pinion gears P1 in a rotatable manner.

The second differential mechanism PL2 is also a single-pinion planetary gear unit comprising: a sun gear S2 connected to the first motor 6; a carrier C2 connected to the ring gear R1 of the first differential mechanism PL1; and a ring gear R2 connected to the output gear 21. The output gear 21 is meshed with the driven gear 23 to distribute the torque to the front wheels 1R and 1L.

In the first differential mechanism PL1, the sun gear S1 and the carrier C1 are engaged to each other through a fourth clutch CL4 to rotate the rotary elements of the first differential mechanism PL1 integrally. The carrier C1 of the first differential mechanism PL1 and the ring gear R2 of the second differential mechanism PL2 are engaged to each other through a fifth clutch CL5. The brake B1 is disposed on the output shaft 15 of the engine 5. For example, a friction clutch and a dog clutch may also be used individually as the clutches CL4 and CL5.

In the hybrid vehicle shown in FIG. 18, the HV-Hi mode in which the ratio of the torque delivered to the ring gear R2 is relatively small is established by engaging the fourth clutch CL4, and the HV-Lo mode in which the ratio of the torque delivered to the ring gear R2 is relatively large is established by engaging the fifth clutch CL5.

Figure 19:
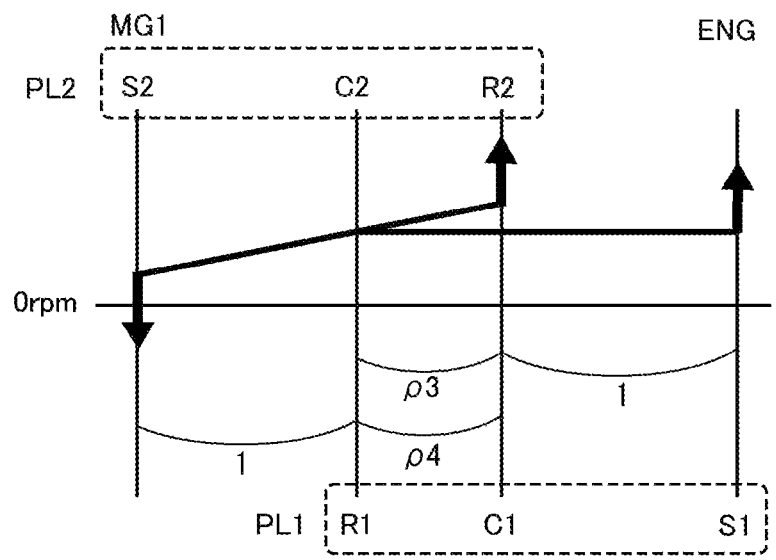
FIG. 19 is a nomographic diagram showing a situation of the vehicle shown in FIG. 18 in the HV-Hi mode.

FIG. 19 indicates rotational speeds of the rotary elements of the first differential mechanism PL1 and the second differential mechanism PL2 in the HV-Hi mode of the hybrid vehicle shown in FIG. 18. As shown in FIG. 19, the HV-Hi mode is established by engaging the fourth clutch CL4 so that the rotary elements in the first differential mechanism PL1 are rotated integrally. Consequently, the carrier C2 as an input element of the second differential mechanism PL2 is rotated at a same speed as the engine 5. In the HV-Hi mode, the sun gear S2 of the second differential mechanism PL2 is allowed to serve as a reaction element by applying reaction torque thereto from the first motor 6, and consequently the ring gear R2 of the second differential mechanism PL2 is allowed to serve as an output element to deliver the torque to the output gear 21. Given that the engine torque delivered to the first motor 6 side is "1", a ratio of the torque applied to the ring gear R2 in the HV-Hi mode may be expressed as "1/ρ4". In the hybrid vehicle shown in FIG. 18, a ratio between teeth number of the ring gear R1 and teeth number of the sun gear S1 is "ρ3", and a ratio between teeth number of the ring gear R2 and teeth number of the sun gear S2 is "ρ4".

Figure 20:
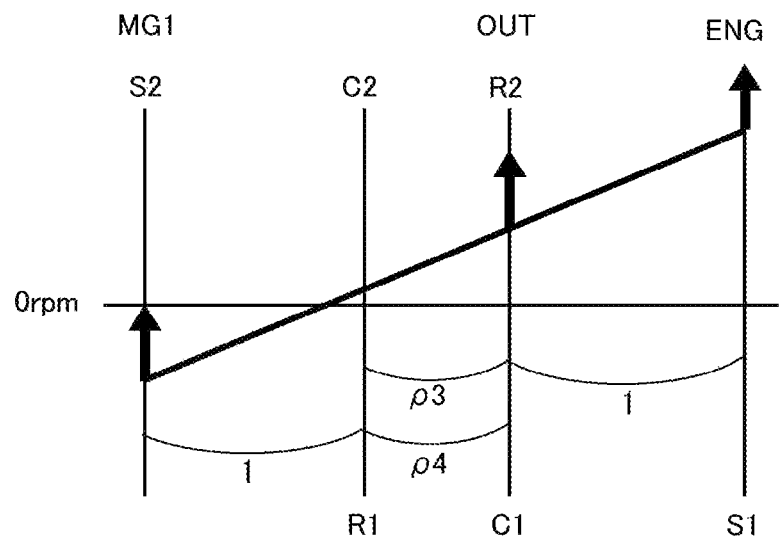
FIG. 20 is a nomographic diagram showing a situation of the vehicle shown in FIG. 18 in the HV-Lo mode.

FIG. 20 indicates rotational speeds of the rotary elements of the first differential mechanism PL1 and the second differential mechanism PL2 in the HV-Lo mode of the hybrid vehicle shown in FIG. 18. As shown in FIG. 20 the HV-Lo mode is established by engaging the fifth clutch CL5 so that the carrier C1 of the first differential mechanism PL1 and the ring gear R2 of the second differential mechanism PL2 are rotated integrally. In addition, the carrier C2 of the second differential mechanism PL2 is connected to the ring gear R1 of the first differential mechanism PL1. In the HV-Lo mode, therefore, the sun gear S1 of the first differential mechanism PL1 serves as an input element, the sun gear S2 of the second differential mechanism PL2 serves as a reaction element, and the ring gear R2 of the second differential mechanism PL2 serves as an output element. In the HV-Lo mode, specifically, the torque of the sun gear S1 of the first differential mechanism PL1 is delivered to the rig gear R2 of the second differential mechanism PL2. In the HV-Lo mode, given that the engine torque delivered to the first motor 6 side is "1", a ratio of the engine torque delivered to the ring gear R2 may be expressed as "1+ρ3+(ρ3/ρ4)". Thus, in the HV-Lo mode, the ratio of the torque delivered from the engine 5 to the ring gear R2 is increased in comparison with that in the HV-Hi mode.

As described, in the hybrid vehicle shown in FIG. 18, the HV mode is established by engaging any one of the fourth clutch CL4 and the fifth clutch CL5. In the hybrid vehicle shown in FIG. 18, the normally stay clutch is used as at least one of the clutches, and hence the shock resulting from occurrence of failure in the other clutch can be reduced.

Figure 21:
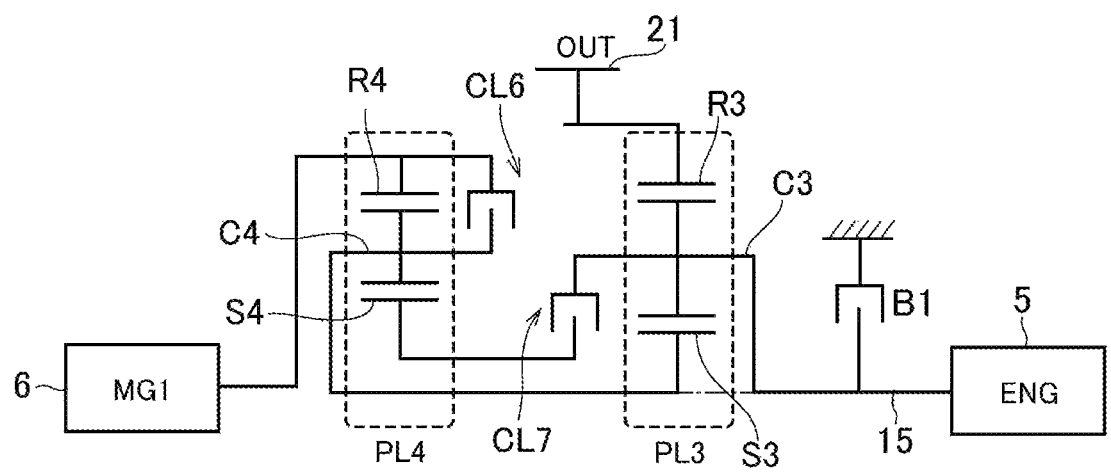
FIG. 21 is a skeleton diagram showing still another example of a structure of the vehicle to which the control system according to the embodiment is applied.

The hybrid vehicle shown in FIG. 21 comprises a third differential mechanism PL3 connected directly to the engine 5, and a fourth differential mechanism PL4 connected directly to the first motor 6.

The third differential mechanism PL3 is also a single-pinion planetary gear unit comprising: a carrier C3 connected to the output shaft 15 of the engine 5; a sun gear S3; and a ring gear R3 connected to the output gear 21. The output gear 21 is also meshed with the driven gear 23 to distribute the torque to the front wheels 1R and 1L.

The fourth differential mechanism PL4 is also a single-pinion planetary gear unit comprising: a ring gear R4 connected to the first motor 6; a carrier C4 connected to the sun gear S3 of the third differential mechanism PL3; and a sun gear S4.

In the fourth differential mechanism PL4, the carrier C4 and the ring gear R4 are engaged to each other through a sixth clutch CL6 to rotate the rotary elements of the fourth differential mechanism PL4 integrally. The carrier C3 of the third differential mechanism PL3 and the sun gear S4 of the fourth differential mechanism PL4 are engaged to each other through a seventh clutch CL7. The brake B1 is also disposed on the output shaft 15 of the engine 5. For example, a friction clutch and a dog clutch may also be used individually as the clutches CL6 and CL7.

In the hybrid vehicle shown in FIG. 21, the HV-Hi mode in which the ratio of the torque delivered to the ring gear R3 is relatively small is established by engaging the sixth clutch CL6, and the HV-Lo mode in which the ratio of the torque delivered to the ring gear R3 is relatively large is established by engaging the seventh clutch CL7.

Figure 22:
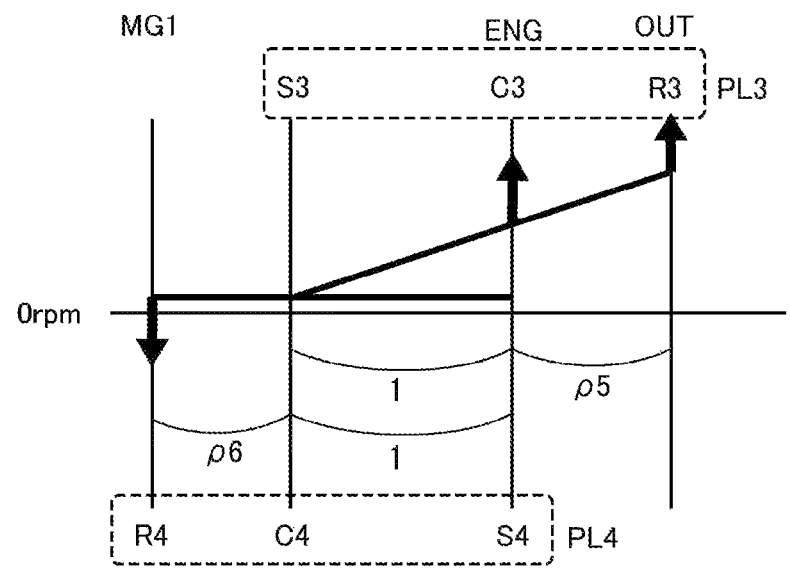
FIG. 22 is a nomographic diagram showing a situation of the vehicle shown in FIG. 21 in the HV-Hi mode.

FIG. 22 indicates rotational speeds of the rotary elements of the third differential mechanism PL3 and the fourth differential mechanism PL4 in the HV-Hi mode of the hybrid vehicle shown in FIG. 21. As shown in FIG. 22, the HV-Hi mode is established by engaging the sixth clutch CL6 so that the rotary elements in the fourth differential mechanism PL4 are rotated integrally. Consequently, the torque of the first motor 6 is delivered to the carrier C4 of the fourth differential mechanism PL4 without being changed. In the HV-Hi mode, torque of the engine 5 is applied to the carrier C3 of the third differential mechanism PL3 and reaction torque established by the first motor 6 is delivered to the sun gear S3 of the third differential mechanism PL3 through the carrier C4 of the fourth differential mechanism PL4. Consequently, the torque is delivered from the ring gear R3 to the output gear 21. Thus, in the HV-Hi mode, the carrier C3 serves as an input element, the sun gear S3 serves as a reaction element, and the ring gear R3 serves as an output element. In the hybrid vehicle shown in FIG. 21, given that the engine torque delivered to the first motor 6 side is "1", a ratio of the torque applied to the ring gear R3 in the HV-Hi mode may be expressed as "$1/\rho5$" where $\rho5$ is a ratio between teeth number of the ring gear R3 and teeth number of the sun gear S3.

Figure 23:
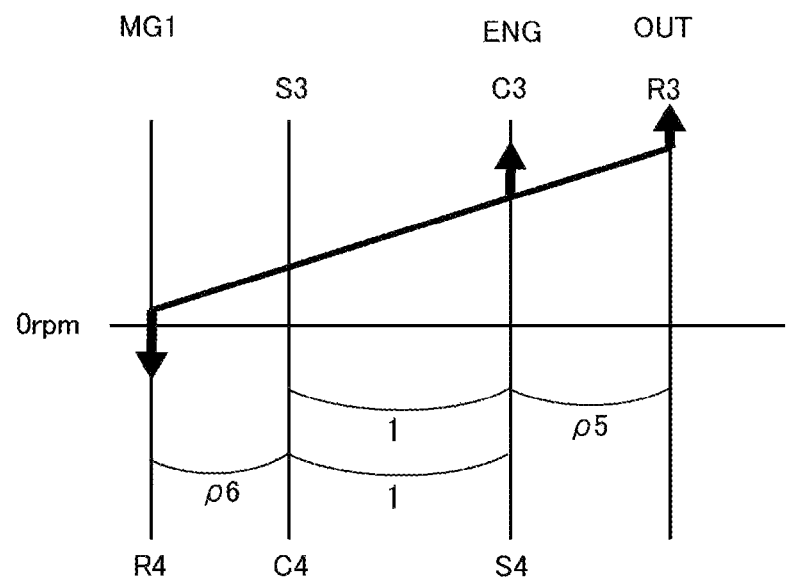
FIG. 23 is a nomographic diagram showing a situation of the vehicle shown in FIG. 21 in the HV-Lo mode.

FIG. 23 indicates rotational speeds of the rotary elements of the third differential mechanism PL3 and the fourth differential mechanism PL4 in the HV-Lo mode of the hybrid vehicle shown in FIG. 21. As shown in FIG. 23, the HV-Lo mode is established by engaging the seventh clutch CL7 so that the carrier C3 of the third differential mechanism PL3 and the sun gear S4 of the fourth differential mechanism PL4 are rotated integrally. In addition, the sun gear S3 of the third differential mechanism PL3 is connected to the carrier C4 of the fourth differential mechanism PL4. In the HV-Lo mode, therefore, the carrier C3 of the third differential mechanism PL3 serves as an input element, the ring gear R4 of the fourth differential mechanism PL4 serves as a reaction element, and the ring gear R3 of the third differential mechanism PL3 serves as an output element. In the HV-Lo mode, specifically, the torque of the carrier C3 of the third differential mechanism PL3 is delivered to the rig gear R3 of the third differential mechanism PL3. In the HV-Lo mode, given that the engine torque delivered to the first motor 6 side is "1", a ratio of the engine torque delivered to the ring gear R3 may be expressed as "$(1+\rho6)/\rho5$" where $\rho6$ is a ratio between teeth number of the ring gear R4 and teeth number of the sun gear S4. Thus, in the HV-Lo mode, the ratio of the torque delivered from the engine 5 to the ring gear R3 is increased in comparison with that in the HV-Hi mode. In addition, given that the rotational speed of the first motor 6 is "0", a speed reducing ratio between the rotational speeds of the engine 5 and the ring gear R3 in the HV-Lo mode is greater than that in the HV-Hi mode.

As described, in the hybrid vehicle shown in FIG. 21, the HV mode is established by engaging any one of the sixth clutch CL6 and the seventh clutch CL7. In the hybrid vehicle shown in FIG. 21, the normally stay clutch is used as at least one of the clutches, and hence the shock resulting from occurrence of failure in the other clutch can be reduced.

Thus, in the hybrid vehicles shown in FIGS. 1, 18, and 21, the first differential mechanism is adapted to perform a differential action among a first rotary element connected to an engine; a second rotary element connected to a motor; and a third rotary element connected to drive wheels. The second differential mechanism is also adapted to perform a differential action among: a fourth rotary element; a fifth rotary element connected to the third rotary element; and a sixth rotary element. Each of the hybrid vehicles individually comprises: a first engagement device that selectively connects the sixth rotary element to the first rotary element or the second rotary element; and a second engagement device that selectively connects any two of the first rotary element, the second rotary element, and the third rotary element, or connects any two of the fourth rotary element, the fifth rotary element, and the sixth rotary element. In the hybrid vehicles, a first mode (i.e., the HV-Lo mode) in which a torque distribution ratio is relatively large is established by engaging any one of the first engagement device and the second engagement device, and a second mode (i.e., the HV-Hi mode) in which a torque distribution ratio is relatively small is established by engaging other one of the first engagement device and the second engagement device.

Figure 24:
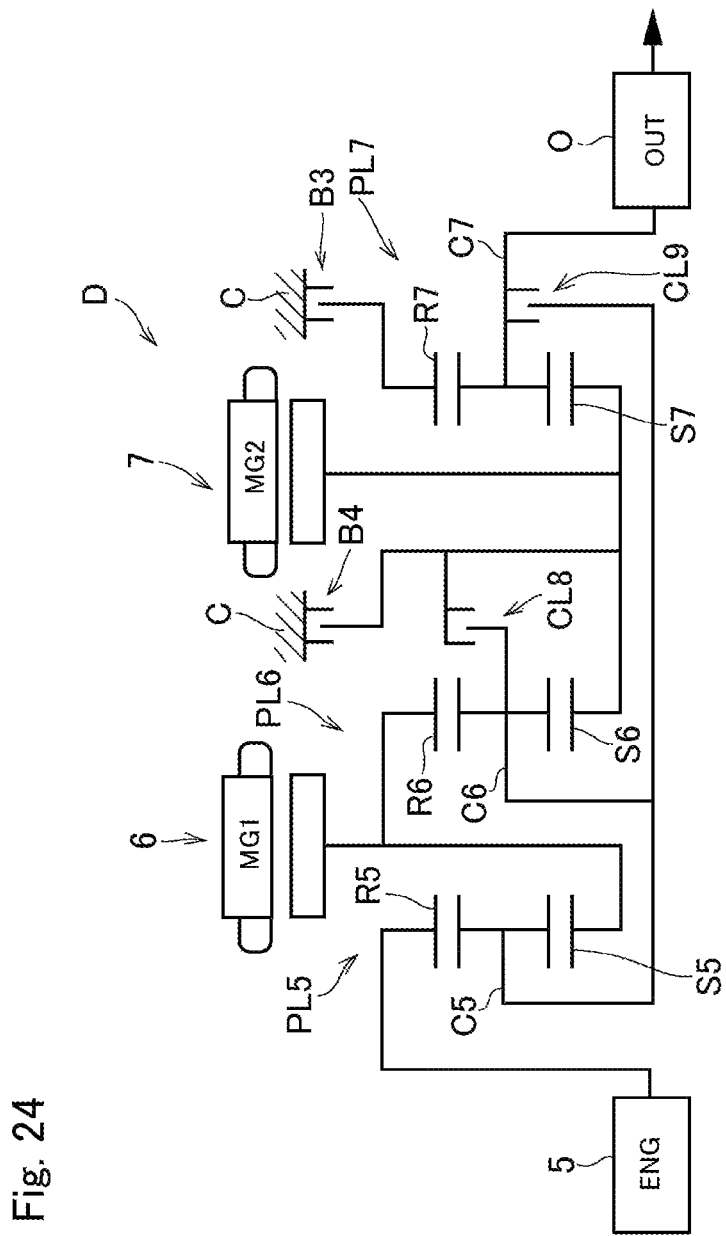
FIG. 24 is a skeleton diagram showing an example of a structure of the vehicle in which the operating mode can be shifted between the fixed mode and the continuously variable mode.

Structure of the first engagement device and the second engagement device should not be limited to the foregoing embodiment. FIG. 24 shows an example of the vehicle in which an operating mode is switched between a fixed mode in which a speed ratio between the engine 5 and the front wheels 1R, 1L is constant, and a continuously variable mode in which the speed ratio between the engine 5 and the front wheels 1R, 1L is varied continuously.

In the vehicle shown in FIG. 24, a transmission mechanism D comprises three sets of single-pinion planetary gear unit PL5, PL6, and PL7. In the first planetary gear unit (as will be called the "fifth differential mechanism" hereinafter) PL5, a ring gear R5 is connected to the engine 5, and a sun gear S5 is connected to the first motor 6. The second planetary gear unit (as will be called the "sixth differential mechanism" hereinafter) PL6 is disposed on an opposite side of the engine 5 across the fifth differential mechanism PL5. In the sixth differential mechanism PL6, a ring gear R6 is connected to the first motor 6 and the sun gear S5 of the fifth differential mechanism PL5, and a carrier C6 is connected to a carrier CS of the fifth differential mechanism PL5. The third planetary gear unit (as will be called the "seventh differential mechanism" hereinafter) PL7 is disposed on an opposite side of the fifth differential mechanism PL5 across the sixth differential mechanism PL6. In the seventh differential mechanism PL7, a sun gear S7 is connected to a sun gear S6 of the sixth differential mechanism PL6, and a carrier C7 is connected to an output member O. The second motor 7 is connected to the sun gear S6 of the sixth differential mechanism PL6 and the sun gear S7 of the seventh differential mechanism PL7.

The carrier C6 of the sixth differential mechanism PL6 is selectively connected to the sun gear S6 of the sixth differential mechanism PL6 or the sun gear S7 of the seventh differential mechanism PL7 through an eighth clutch CL8. The carrier C5 of the fifth differential mechanism PL5 is selectively connected to the carrier C7 of the seventh differential mechanism PL7 through a ninth clutch CL9. A ring gear R7 of the seventh differential mechanism PL7 is selectively connected to the casing C through a third brake B3. The sun gear S6 of the sixth differential mechanism PL6 and the sun gear S7 of the seventh differential mechanism PL7 are selectively connected to the casing C through a fourth brake B4. For example, a frictional engagement device or a dog clutch may be used individually as the eighth clutch CL8, the ninth clutch CL9, the third brake B3, and the fourth brake B4. In the vehicle shown in FIG. 24, the sun gear S6 of the sixth differential mechanism PL6, the sun gear S7 of the seventh differential mechanism PL7, or the ring gear R7 of the seventh differential mechanism PL7 serves as the first reaction element and the second reaction element. In addition, the eighth clutch CL8, the ninth clutch CL9, the third brake B3, and the fourth brake B4 serve as the first engagement device and the second engagement device.

Figures 25, 26:
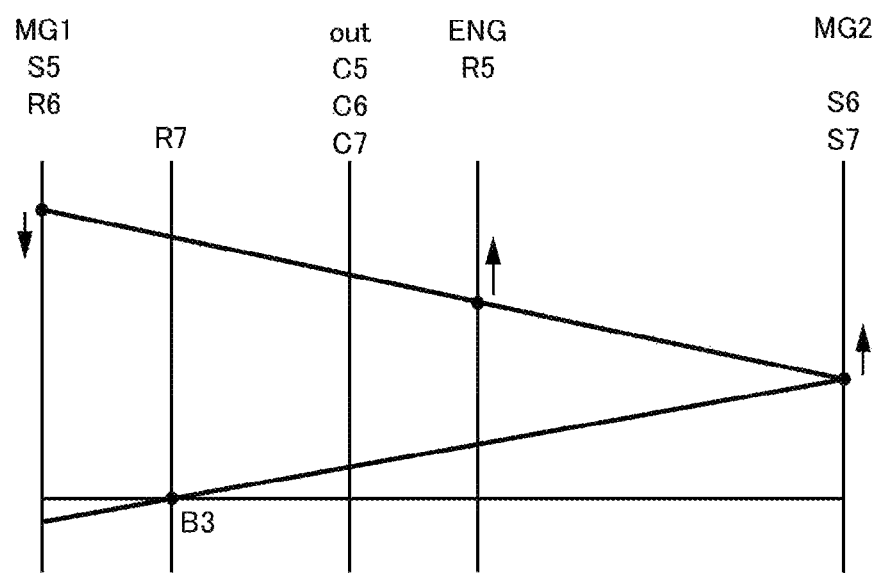
FIG. 25 is a table showing engagement states of engagement devices and operating conditions of the prime movers in each operating mode of the vehicle shown in FIG. 24.
FIG. 26 is a nomographic diagram showing rotational speeds of rotary elements of the transmission and direction of torques of the engine and the motors in the first mode.

FIG. 25 shows engagement states of the eighth clutch CL8, the ninth clutch CL9, the third brake B3, and the fourth brake B4 in each operating mode of the vehicle shown in FIG. 24. In FIG. 25, "O" represents that the engagement device is in engagement, and "-" represents the engagement device is in disengagement. As shown in FIG. 25, in the vehicle shown in FIG. 24: a first mode is established by engaging only the third brake B3; a second mode is established by engaging the third brake B3 and the eighth clutch CL8; a third mode is established by engaging the third brake B3 and the ninth clutch CL9; a fourth mode is established by engaging only the ninth clutch CL9; a fifth mode is established by engaging the eighth clutch CL8 and the ninth clutch CL9; and a sixth mode is established by engaging the ninth clutch CL9 and the fourth brake B4.

FIG. 26 indicates rotational speeds of the rotary elements of the transmission mechanism D, and directions of torques of the engine 5, the first motor 6, and the second motor 7 in the first mode. In the first mode, since the third brake B3 is in engagement, a rotational speed of the sun gear S7 of the seventh differential mechanism PL7 is maintained in accordance with a vehicle speed. In this situation, a drive torque generated by the second motor 7 is delivered to the carrier C7 while being multiplied by establishing a reaction force by the third brake B3. In the vehicle shown in FIG. 24, a rotational speed of the engine 5 may also be varied continuously by controlling a rotational speed of the first motor 6. In this situation, therefore, a torque of the engine 5 is delivered to the carrier C7 of the seventh differential mechanism PL7 by controlling the rotational speed of the first motor 6 in an optimally fuel efficient manner while establishing a reaction torque by the first motor 6. Thus, the first mode is the continuously variable mode in which the speed ratio between the engine 5 and the front wheels 1R, 1L can be varied continuously.

Figure 27:
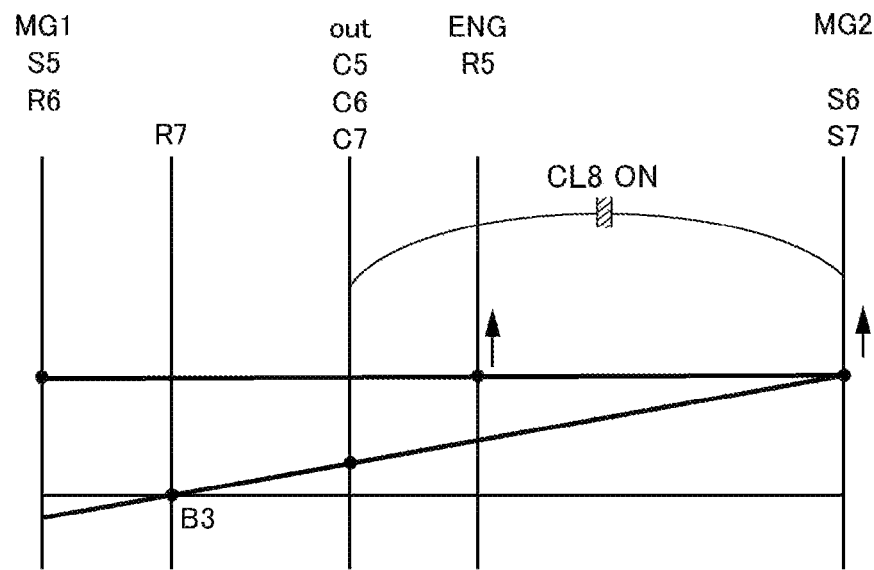
FIG. 27 is a nomographic diagram showing rotational speeds of rotary elements of the transmission and direction of torques of the engine and the motors in the second mode.

FIG. 27 indicates rotational speeds of the rotary elements of the transmission mechanism D, and directions of torques of the engine 5, the first motor 6, and the second motor 7 in the second mode. In the second mode, since the third brake B3 is in engagement, a rotational speed of the sun gear S7 of the seventh differential mechanism PL7 is also maintained in accordance with a vehicle speed, and the second motor 7 generates a drive torque. In this situation, since the eighth clutch CL8 is also in engagement, the rotary elements in the fifth differential mechanism PL5 and the sixth differential mechanism PL6 are rotated integrally so that a rotational speed of the engine 5 is maintained in accordance with a vehicle speed. Thus, the second mode is the fixed mode in which a speed ratio between the engine 5 and the front wheels 1R, 1L is constant. In the second mode, the reaction torque to deliver the output torque of the engine 5 to the front wheels 1R, 1L is established by the third brake B3. That is, the output torque of the engine 5 may be delivered to the carrier C7 of the seventh differential mechanism PL7 without establishing the reaction torque by the first motor 6.

Figure 28:
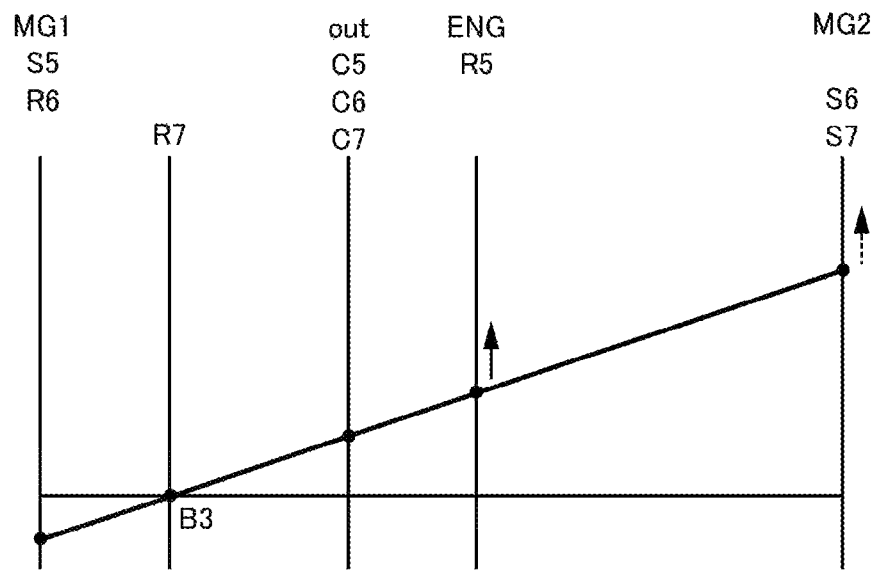
FIG. 28 is a nomographic diagram showing rotational speeds of rotary elements of the transmission and direction of torques of the engine and the motors in the third mode.

FIG. 28 indicates rotational speeds of the rotary elements of the transmission mechanism D, and directions of torques of the engine 5, the first motor 6, and the second motor 7 in the third mode. In the third mode, since the third brake B3 and the ninth clutch CL9 are engaged, the rotary elements in the differential mechanisms PL5, PL6, and PL7 are rotated at speeds governed by the vehicle speed and the gear ratios of the differential mechanisms PL5, PL6, and PL7. In the third mode, therefore, the rotational speed of the engine 5 is also maintained in accordance with a vehicle speed. That is, the third mode is also the fixed mode in which a speed ratio between the engine 5 and the front wheels 1R, 1L is constant. In the third mode, the reaction torque to deliver the output torque of the engine 5 to the front wheels 1R, 1L is also established by the third brake B3. That is, the output torque of the engine 5 may be delivered to the carrier C7 of the seventh differential mechanism PL7 without establishing the reaction torque by the first motor 6. In addition, in the third mode, the second motor 7 may generate a drive torque according to need.

Figure 29:
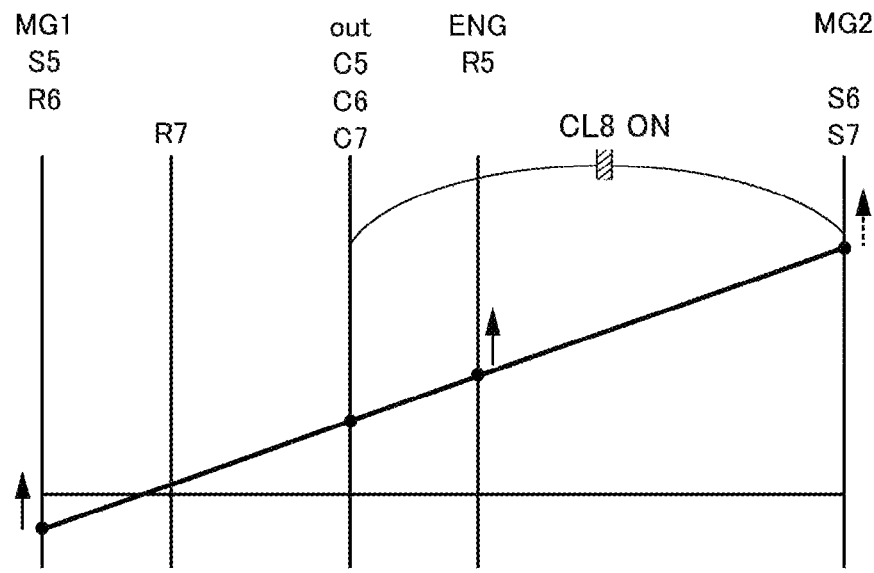
FIG. 29 is a nomographic diagram showing rotational speeds of rotary elements of the transmission and direction of torques of the engine and the motors in the fourth mode.

FIG. 29 indicates rotational speeds of the rotary elements of the transmission mechanism D, and directions of torques of the engine 5, the first motor 6, and the second motor 7 in the fourth mode. As described, in the fourth mode, only the ninth clutch CL9 is in engagement. In the fourth mode, therefore, rotational speeds of the rotary elements are governed by the vehicle speed and a rotational speed of any one of the rotary elements. As described, the rotational speed of the engine 5 is controlled in an optimally fuel efficient manner by controlling the rotational speed of the first motor 6. That is, the fourth mode first mode is also the continuously variable mode in which the speed ratio between the engine 5 and the front wheels 1R, 1L can be varied continuously. In the fourth mode, the torque of the engine 5 is delivered to the front wheels 1R, 1L by establishing the reaction torque by the first motor 6. In addition, in the fourth mode, the second motor 7 may generate a drive torque according to need.

Figure 30:
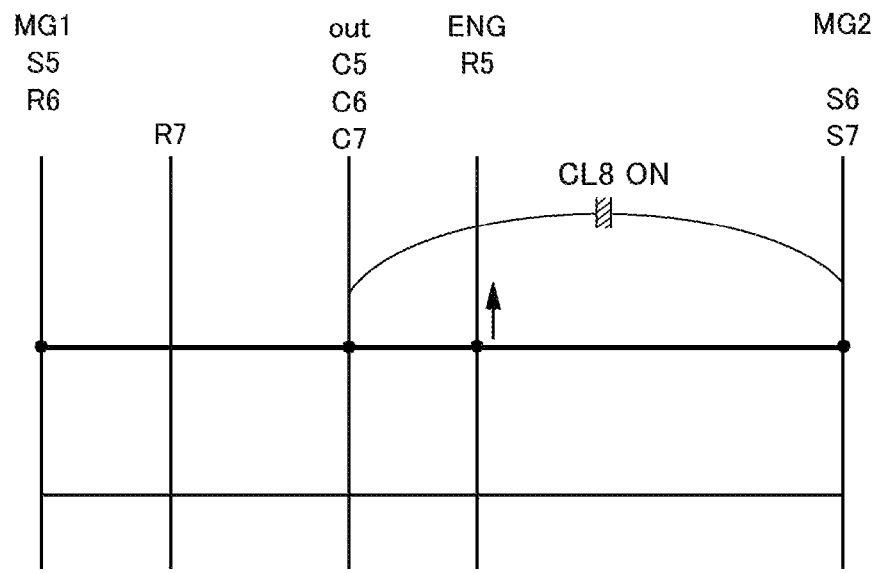
FIG. 30 is a nomographic diagram showing rotational speeds of rotary elements of the transmission and direction of torques of the engine and the motors in the fifth mode.

FIG. 30 indicates rotational speeds of the rotary elements of the transmission mechanism D, and directions of torques of the engine 5, the first motor 6, and the second motor 7 in the fifth mode. In the fifth mode, since the eighth clutch CL8 and the ninth clutch CL9 are engaged, the rotary elements in the differential mechanisms PL5, PL6, and PL7 are rotated integrally so that a rotational speed of the engine 5 is maintained in accordance with a vehicle speed. That is, the fifth mode is also the fixed mode in which the speed ratio between the engine 5 and the front wheels 1R, 1L is "1". In the fifth mode, in principle, it is not necessary to establish the reaction torque by the first motor 6 to deliver the output torque of the engine 5 to the front wheels 1R, 1L. In the fifth mode, therefore, the vehicle is propelled only by the drive torque generated by the engine 5 in principle.

Figure 31:
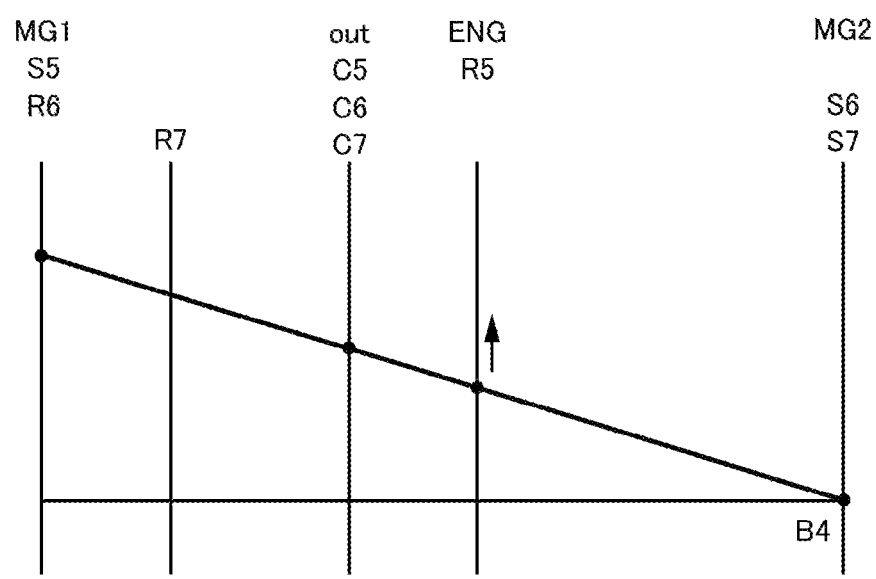
FIG. 31 is a nomographic diagram showing rotational speeds of rotary elements of the transmission and direction of torques of the engine and the motors in the sixth mode.

FIG. 31 indicates rotational speeds of the rotary elements of the transmission mechanism D, and directions of torques of the engine 5, the first motor 6, and the second motor 7 in the sixth mode. In the sixth mode, since the fourth brake B4 and the ninth clutch CL9 are engaged, the rotary elements in the differential mechanisms PL5, PL6, and PL7 are rotated at speeds governed by the vehicle speed and the gear ratios of the differential mechanisms PL5, PL6, and PL7. In the sixth mode, therefore, the rotational speed of the engine 5 is also maintained in accordance with a vehicle speed. That is, the sixth mode is also the fixed mode in which a speed ratio between the engine 5 and the front wheels 1R, 1L is constant. In the sixth mode, the reaction torque to deliver the output torque of the engine 5 to the front wheels 1R, 1L is established by the fourth brake B4. That is, the output torque of the engine 5 may be delivered to the carrier C7 of the seventh differential mechanism PL7 without establishing the reaction torque by the first motor 6.

Thus, in the vehicle shown in FIG. 24, the HV mode is established by engaging any one or two of the eighth clutch CL8, the ninth clutch CL9, the third brake B3, and the fourth brake B4. In the hybrid vehicle shown in FIG. 24, the normally stay clutch is used as at least one of the clutches, and hence the shock resulting from occurrence of failure in the other clutch can be reduced.

What is claimed is:

1. A drive force control system for a vehicle, comprising:
an engine;
a rotary machine; and
a differential mechanism that is configured to perform a differential rotation among a first rotary member connected to the engine, a second rotary member connected the rotary machine, and a third rotary member connected to an output member, the differential mechanism comprises a plurality of rotary elements;
a first engagement device that connects a first rotary element and a second rotary element;
a second engagement device that connects a third rotary element and a fourth rotary element; and
a controller that controls the first engagement device and the second engagement device,
wherein at least one of the first engagement device and the second engagement device is a normally stay clutch, and
the normally stay clutch is configured to be engaged upon reception of an engagement command signal and disengaged upon reception of a disengagement command signal, and to maintain a current engagement state when a signal transmission to the normally stay clutch is stopped,
wherein the differential mechanism is configured to operate in:
a first operating mode in which a torque of the engine is delivered to the output member with a first predetermined ratio by engaging any one of the first engagement device and the second engagement device; and
a second operating mode in which the torque of the engine is delivered to the output member with a second predetermined ratio that is smaller than the first predetermined ratio by engaging other one of the first engagement device and the second engagement device,
wherein the engine is on during the first operating mode and the second operating mode, and
wherein the controller is configured to:
determine an engagement device in which a failure occurs out of the first engagement device and the second engagement device;
determine the engagement device in which the failure occurs is engaged or disengaged;
disengage an engagement device working properly if the engagement device in which the failure occurs is engaged; and
engage the engagement device working properly if the engagement device in which the failure occurs is disengaged.

2. The drive force control system for the vehicle as claimed in claim 1, wherein the differential mechanism is further configured to operate in:
a fixed mode in which a speed ratio between the engine and the output member is constant by engaging the first engagement device and the second engagement device; and
a continuously variable mode in which the speed ratio between the engine and the output member is varied continuously by engaging any one of first engagement device and the second engagement device.

3. The drive force control system for the vehicle as claimed in claim 1, wherein the third rotary element includes any one of the first rotary element and the second rotary element.

4. The drive force control system for the vehicle as claimed in claim 1, wherein the fourth rotary element includes a rotary element other than the first rotary element, the second rotary element, and the third rotary element.

5. The drive force control system for the vehicle as claimed in claim 1, wherein both of the first engagement device and the second engagement device are the normally stay clutch.

6. The drive force control system for the vehicle as claimed in claim 1,
wherein one of the first engagement device and the second engagement device is a normally open clutch, and
wherein the normally open clutch is configured to be engaged upon reception of the engagement command signal, and disengaged when the signal transmission to the normally open clutch is stopped.

7. The drive force control system for the vehicle as claimed in claim 5, further comprising:
a prime mover configured to deliver an output torque to the output member without passing through the differential mechanism.

8. The drive force control system for the vehicle as claimed in claim 1,
wherein one of the first engagement device and the second engagement device is a normally close clutch, and
wherein the normally close clutch is configured to be disengaged upon reception of the disengagement command signal, and engaged when the signal transmission to the normally close clutch is stopped.

9. The drive force control system for the vehicle as claimed in claim 1, wherein the normally stay clutch includes a dog clutch, comprising:
a pair of rotary member being opposed to each other while being configured to rotate relatively to each other;
a rod that pushes and withdraws one of the rotary members toward/away from the other rotary member upon reception of the engagement command signal or the disengagement command signal; and
a compression spring that transmits a load of the rod to said one of the rotary members.

* * * * *